United States Patent [19]

Muftic

[11] Patent Number: 5,850,442
[45] Date of Patent: Dec. 15, 1998

[54] SECURE WORLD WIDE ELECTRONIC COMMERCE OVER AN OPEN NETWORK

[75] Inventor: Sead Muftic, Hasselby, Sweden

[73] Assignee: Entegrity Solutions Corporation, San Jose, Calif.

[21] Appl. No.: 622,015

[22] Filed: Mar. 26, 1996

[51] Int. Cl.[6] .................................................. H04L 9/00
[52] U.S. Cl. .............................. 380/21; 380/30; 380/49; 380/25
[58] Field of Search ................................ 380/21, 23, 25, 380/30, 49

[56] References Cited

U.S. PATENT DOCUMENTS

| | | | |
|---|---|---|---|
| 5,005,200 | 4/1991 | Fischer | 380/30 |
| 5,371,794 | 12/1994 | Diffie et al. | 380/30 |
| 5,475,758 | 12/1995 | Kikuchi | 380/25 |

*Primary Examiner*—David Cain
*Attorney, Agent, or Firm*—Foley & Lardner

[57] ABSTRACT

A network of users and servers of a type found in the Internet system is extended to permit secure electronic commercial transactions to be accomplished. The network is extended to include a public key infrastructure and electronic transactions can be securely performed utilizing smart token technology. Conduct of a variety of common electronic business transactions over such an extended network is provided.

38 Claims, 32 Drawing Sheets

1900 → 
```
DOMAIN NAME: ELECTRONIC CASH

OWNER NAME (optional):

CURRENT VALUE:
```

1910 →
```
ISSUER NAME AND ISSUER NUMBER:

NATIONALITY:

FACE AMOUNT:

AMOUNT REMAINING:

ISSUERS SIGNATURE:
```

---

```
HISTORY:

AMOUNT              TRANSFEREE              DATE/TIME (1 of N RECORDS)
```

1920 →
```
RECEIPTS FOR CASH EXPENDED:
```

1930 →
```
FUNCTIONS:
    GET_CASH
    PAY_CASH
```

Figure 19

SECURE WORLD WIDE ELECTRONIC COMMERCE OVER AN OPEN NETWORK

This application is related to U.S. application Ser. No. 08/573,025, filed Dec. 15, 1995 in the name of the same inventor and entitled SECURITY INFRASTRUCTURE FOR ELECTRONIC TRANSACTIONS (hereinafter Infrastructure application) which is incorporated herein by reference in its entirety.

This application is also related to U.S. application Ser. No. 08/573,033, filed Dec. 15, 1995 in the name of the same inventor and entitled SMART TOKEN SYSTEM FOR SECURE ELECTRONIC TRANSACTIONS AND IDENTIFICATION (hereinafter Smart Token application) which is incorporated herein by reference in its entirety.

TECHNICAL FIELD

This invention is directed to the field of communication systems and more particularly to communication systems which utilizes smart tokens, such smart cards or PCMCIA cards, and a public key infrastructure for enabling secure electronic transactions to occur over an open network.

BACKGROUND ART

Encryption of information is normally undertaken to ensure privacy, that is, so that no one other than the intended recipient can decrypt the information. Encryption is also undertaken to ensure the authenticity of the information, that is, that a message which purports to originate with a particular source actually does so and has not been tampered with.

"Encrypting" a message means to scramble it in a way which renders it unreadable to anyone except the intended recipient. In one form, a cryptographic "key" is utilized to encrypt the message and the same key is required to transform it from encrypted form back to plain text by decrypting it. An encryption system which operates in this way is known as a "single-key" encryption system. In such a system, the key must be available to both the sender and the receiver. If unauthorized persons have access to the key, then they can decrypt the encoded message and the object of privacy is defeated. The most obvious drawback of single key encryption systems is that it is not often convenient to provide the sender and the receiver with the same key, since they may be located far apart. A key can be transmitted across a secure channel from the sender to the receiver, but if a secure channel is available, there is no need for encryption.

In a public key cryptographic system each participant has two related keys. A public key which is publicly available and a related private key which is not. The public and private keys are duals of each other in the sense that material encrypted with the public key can only be decrypted using the private key. Material encrypted with the private key, on the other hand, can be decrypted only using the public key. The keys utilized in public key cryptographic systems are such that knowledge of the public key does not help deduce the corresponding private key. The public key can be published and widely disseminated across a communications network or otherwise and material can be sent in privacy to a recipient by encoding the material with the recipient's public key. Only the recipient can decrypt material encrypted with the recipient's public key. Not even the originator who does the encryption using the recipient's public key is able to decrypt that which he himself has encrypted.

Sender's authentication can also be achieved utilizing cryptographic systems. In a single key system, a sender, by encrypting a message with a key known only to authorized persons, tells the recipient that the message came from an authorized source.

In a public key cryptographic system, if the sender encrypts information using the sender's secret key, all recipients will be able to decipher the information using the sender's public key, which is available to all. The recipients can be assured that the information originated with the sender, because the public key will only decrypt material encoded with the sender's private key. Since, presumably, only the sender has the private key, the sender cannot later disavow that he sent the information.

The use of encryption techniques provides a basis for creating electronic signatures to documents which are even less subject to forgery than handwritten signatures. There are two ways in which encryption can be utilized to "sign" a document. The first method is by encrypting the entire document using the signer's private key. The document can be read by anyone with the signer's public key and, since the signer alone possesses his private key, the encrypted document surely originated with the signer. Encryption of large documents requires considerable computational resources and, to speed up the process, a message digest may be used.

A message digest of the document is analogous to a cyclic redundancy code (CRC) check sum attached to the end of a packet. The information in the body of the packet is processed mathematically to produce a unique check sum which is appended to the end of the packet. The integrity of the body of the packet is checked at the receiving end by recalculating the check sum based on the received text and seeing if it matches the check sum appended to the packet. If it does, one assumes that the contents of the body of packet is unchanged from that present at the sending end. The same can be done with entire documents.

In modern implementations, a message digest is created using a cryptographically strong one way hash function based on the message text and the message digest operates like a CRC check sum.

A clear text document may be signed by creating the message digest and then by encrypting the message digest using the signer's private key. Authentication that the content of the document has not been changed is achieved by computing the message digest of the received text and comparing it with the message digest decrypted using the signer's public key. If they agree, one may have a high degree of confidence that the document has been unchanged from the time it was signed, until the present and further, that that which the sender "signed" was the same document.

Public key encryption software is widely available. For example, Pretty Good™ Privacy public key encryption software is available for non-commercial use over the Internet in a form published by Phillip Zimmerman. One version, is PGP version 2.6.2 of Oct. 11, 1994. It is available from the Massachusetts Institute of Technology at net-dis.mit.adu, a controlled FTP site that has restrictions and limitations to comply with export control requirements. Software resides in the directory /pub/PGP. A fully licensed version of PGP for commercial use in the U.S.A. and Canada is available through ViaCrypt in Phoenix, Ariz.

Some public key encryption systems utilize a single key encryption of the body of the text with the key changing from session to session. The session key is encrypted utilizing the recipient's public key so that the encryption and decryption times are shorter.

The Federal Data Encryption Standard (DES) is one available form of single key encryption system.

No data security system is impenetrable. In any data security system, one must question whether the information protected is more valuable to an attacker than the cost of the attack. Public key encryption systems are most vulnerable if the public keys are tampered with.

An example will illustrate the problem. Suppose an originator wishes to send a private message to a recipient. The originator could download the recipient's public key certificate from an electronic bulletin board system and then encrypt the letter to the recipient with that public key and send it to him over an E-mail facility such as Internet. Unfortunately, an interloper could generate a public key of his own with the recipient's user ID attached to it and substitute the phony public key in place of the recipient's real public key. If the originator unwittingly uses a phony key belonging to the interloper instead of to the intended recipient, everything would look normal because the phony key has the recipient's user ID. Now the interloper is in a position to decipher the message intended for the recipient because the interloper has the related private key. The interloper may even go so far as to reencrypt the deciphered message with the recipient's real public key and send it on to the recipient so that no one suspects any wrongdoing. Worse yet, the interloper can make apparently good signatures on behalf of the recipient using the private key because everyone will believe the phony public key is authentic and will utilize it to check the recipient's signatures.

To prevent this from happening, requires preventing someone from tampering with public keys. If one obtained the recipient's public key directly from the recipient, there is no doubt about the authenticity of the public key. However, where the public key is acquired from a source of uncertain reliability, there may still be a problem. One way to obtain the recipient's public key would be to obtain it from a trusted third party who knows he has a good copy of the recipient's public key. A trusted third party could sign the recipient's public key, utilizing the trusted third party's private key, thus vouching for the integrity of the recipient's public key. However, to be sure that the third party's public key is authentic, requires that the sender have a known good copy of the third party's public key with which to check his signature. A widely trusted third party could specialize in providing a service of vouching for the public keys of other parties. This trusted third party could be regarded as a key server or as a certifying authority. Any public key certificates bearing the certifying authority's signature would be trusted as truly belonging to whom they appear to belong to. Users who desire to participate would need a known good copy of the certifying authority's public key so that the certifying authority's signatures could be verified.

Public key encryption systems are also subject to a vulnerability involving the use of bogus time stamps. A user may alter the date and time setting of the user's systems clock and generate either public key certificates or signatures that appear to have been created at a different time. He can make it appear that a document was signed earlier or later than it was actually signed or that the public's secret key pair was created earlier or later. This may have some type of benefit, for example, by creating circumstances which might allow him to repudiate a signature. In situations where it is critical that a signature have the actual correct date and time, an electronic equivalent of a notary can be utilized. An electronic notary would apply the notary's electronic signature to other people's electronic signatures, thus witnessing the date and time of the signed document. A notary could actually maintain a log of detached signature certificates and make it available for public access. The notary's signature would have a trusted time stamp which might carry more credibility than a time stamp on the original signature alone.

In most open network architectures, security is an ad hoc thing. Individual stations having access to the network may or may not choose to utilize encryption in their transmissions. If they do so, they alone are responsible for ensuring that they have properly authentic keys of the person with whom they are communicating. Some efforts have been made to standardize security procedures for such a network. For example, the current state of the development for secure systems across the Internet is found in the Network Working Group Request For Comments No. 1421, dated February 1993 (RFC 1421). This document addresses proposals for privacy enhancement for Internet electronic mail, namely, message encryption and authentication procedures. That document is incorporated in its entirety by reference into this application.

A second proposal, Network Working Group Request For Comments No. 1422, also dated February 1993, addresses privacy enhancement for Internet electronic mail and particularly addresses certificate-based key management. This document is also incorporated by reference into this application in its entirety.

These proposals incorporate concepts utilized in the X.400 Message Handling System model of CCITT Recommendation X.400, the directory system Recommendation X.500 and the CCITT 1988 Recommendation X.509 directed to an authentication framework.

As advances in technology permit continued increases in the degree of miniaturization of electronic components, smart cards have been developed which include a processor and/or memory built into a transport medium the size of a typical credit card. The processors in these cards can be programmed like any other computer to perform desired functions. Smart card readers are known which permit one to both read the contents of a smart card, but also to interact with the smart card to change its contents and to accomplish cooperative functions which can range from the simple to the sophisticated.

A number of applications of smart card technology have been proposed. However, only relatively few have been actually implemented and those that have, have been limited mainly to a single subject matter domain.

Automatic teller machine banking is well known in the art by which one accesses a bank account through the use of a bank card or a credit card and a personal identification number (PIN). Many account functions can be performed using ATM's; however, many cannot. Further, there is inconvenience associated with physically travelling to a nearby ATM machine in order to obtain banking services.

Some banks provide on-line access to some account information, which might be accessible from a user's personal computer, but these systems do not permit many important and desirable account functions, such as cash withdrawals.

Credit cards are also well known in the art. A credit card issuer provides a line of credit to a card holder, typically, and the card holder draws on that line of credit to make purchases from merchants who accept the card. The merchants can obtain cash value from the credit card issuer almost immediately at the cost of a service fee or percentage.

There have been proposals for the creation and use of electronic money. However, wide spread usage of the proposals has not been achieved, perhaps because of the complexities associated with utilizing the technology and because of the capital investment required to equip commercial establishments with terminals which can accept and process electronic money.

One of the problems with the prior art proposals is that they are directed only to Internet mail and do not cover a variety of the other types of services which might be performed over an open network. Specifically, they do not address secure transactions utilizing HTTP (Hypertext Transfer Protocol) and they do not address program-to-program communications.

Another problem with the prior art identified above is that for the most part these represent recommendations and proposals and do not represent actual implementations of systems for carrying out secure transactions.

Another problem with the prior art is that there is no consistent application programming interface usable in all types of environments where secured transactions are needed.

Another problem with the prior art is that there is no consistent public key infrastructure which can actually and automatically provide the certifications required for a public key system.

Another problem with the prior art is that there is no arrangement of certifying authorities which can cross policy certifying authority boundaries in pursuit of a global authorization system which will permit secure transactions to be undertaken world wide transparently.

Another problem of the prior art is that there is no way for permitting secure transactions to cross organizational boundaries in a way that is convenient and transparent.

Another problem with the prior art resides in the fact that there is no suitable over all system disclosed which permits the conduct of generalized world wide electronic commerce.

DISCLOSURE OF THE INVENTION

The invention disclosed herein utilizes smart token technologies and a public key infrastructure to permit world wide electronic commercial transactions to be implemented in a highly secure manner over an open network.

The disclosed invention also permits network users to rely on information placed on home pages or on other servers as authentic.

The invention disclosed herein also permits a user to search via either a white pages or yellow pages server for selected information in order to locate the servers on which such information might be found.

The invention disclosed herein also permits ordering of goods and services in a secure manner over an unsecure network.

The invention disclosed herein also permits the payment for goods and services to be transmitted across an open network without fear of diversion to an unauthorized payee.

The invention also permits the delivery of intangible personal property and various electronic products in a secure fashion over a network.

The invention disclosed herein also permits the negotiation and formation of contracts in a secure manner over an open network.

The invention disclosed herein also permits conduct of auctions over an open network in a practical, reliable and trustworthy manner.

The invention disclosed herein also permits the execution of guarantees in a trustworthy and reliable manner over an open network.

The invention disclosed herein also permits the transfers of electronic payments, including credit card numbers and the transfer of electronic cash across an open network in a secure and reliable manner.

The invention also permits the handling of various stock transactions, including tenders, in a secure fashion over an open network.

The invention disclosed herein has as a purpose the application of smart token technologies to the above endeavors in a practical and highly secure way.

Another advantage of the invention lies in the ability to use smart cards with integrated circuit chips or PCMCIA cards as smart tokens.

Another advantage of the invention is that all application level procedures can be implemented utilizing a common standard application programming interface.

Another advantage of the invention lies in a software architecture particularly suited for use with smart tokens.

Another advantage of the invention lies in an economical hardware architecture which enables smart token technology to be utilized inexpensively and as an add on to existing computer systems.

Another advantage of the invention lies in the use of a smart token which handles identification and credentials, creates and verifies digital signatures, supports key and access management, and the functions of an electronic wallet or an electronic safe.

One principal advantage of the invention is the ability to utilize smart tokens to undertake secure financial and other electronic transactions over a publicly accessible networks.

Another advantage of the invention resides in automatic and controlled access to network applications utilizing a smart token.

Another advantage of the invention resides in the creation and processing of electronic cash which can be securely transferred across a network or which can be used locally with the same degree of convenience as currency and coinage.

Another advantage of the invention is the integration of smart token technology with a public key infrastructure to facilitate secure electronic transactions over an unsecure network.

One advantage provided by the invention is that of providing a public key infrastructure which will support global secure transactions across organizational, political and policy certifying authority boundaries.

Another advantage of the invention lies in providing a consistent application programming interface which can be utilized in all types of transactions for ensuring security and authenticity of the certified products.

Another advantage of the invention resides in the ability to provide key management and distribution in a secure manner and in a manner which protects public keys from tampering.

Another advantage of the invention is the provision of trusted third party and notary services.

Another advantage of the invention is the provision of privacy and authenticity in the transmission of information by way of a consistent and easy to use interface.

Another advantage of the invention is the provision of a certificate-based public key system in which certificates are readily available and verifiable.

Another advantage of the invention is to provide a system where certificates are readily accessible and verifiable.

These and other advantages and objects of the invention are achieved by providing a network for the conduct of electronic commercial transactions which uses public key cryptography. The network include a plurality of user terminals connected to the network, at least some of which are equipped with the ability to read and/or write smart tokens containing cryptographic keys. A plurality of servers and one or more security servers are also connected to the network. The security server certifies the public keys of users registered to engage in commercial transactions or the public keys of other security servers. The network is arranged so that encryption keys from a smart token may be authenticated by one or more security servers and used to ensure the origin and authenticity of electronic transactions conducted using said user terminals and servers.

In one embodiment, the servers are world wide web servers and the user terminals run web browser software such as Mosaic. The security servers link all registered users into a public key infrastructure. Information about the contents of servers may be obtained using an indexing system. The indexing system may be a white pages directory, a yellow pages directory or the indexing system may be generated by a webcrawler.

The invention is also directed to a method of conducting electronic commerce over an unsecured network by authenticating (as to its origin) information placed on at least one server of the network, accessing the information, ordering a product or services after accessing said information by sending an electronic message, and authenticating said electronic message as to origin. Ordering of a product or service may include an electronic payment.

Authenticating information on a server as to its origin includes denying access to a user logged on to the server to editing functionality resident on said server unless information received from said user decodes properly using an authorized public key stored on said server. Authenticating an electronic message as to origin may involve validating a public key of a public key encryption pair of a user originating a message by using digital signatures of one or more certification authorities. Public keys stored on said server are validated using a public key infrastructure. Information on application servers may be indexed in a white or yellow pages directory system, may be accessed by a webcrawler or may be discovered by an intelligent agent.

The invention is also directed to a method of conducting electronic commerce over an unsecured network by registering users in a public key infrastructure system and certifying one or more public keys for each user and by authenticating electronic transactions using a certified public key. In this way, the binding between a public key and a user can be authenticated. This method has applicability to a number of business transactions such as in authenticating offers, counteroffers and acceptance in a contract negotiations process; authenticating offers, bids and/or confirmations of sale in an auction process; authenticating a guarantee; authenticating orders and/or payments in a purchase/sell transaction; authenticating transfers of intangible personal property; authenticating tender offers and/or one or more tenders of shares of stock; authenticating certificates of insurance; authenticating transfers of intangibles related to an escrow transaction and authenticating transfers of electronic money.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 19 is a representation of an exemplary layout for an electronic cash domain.

BEST MODE FOR CARRYING OUT THE INVENTION

Figure 1:
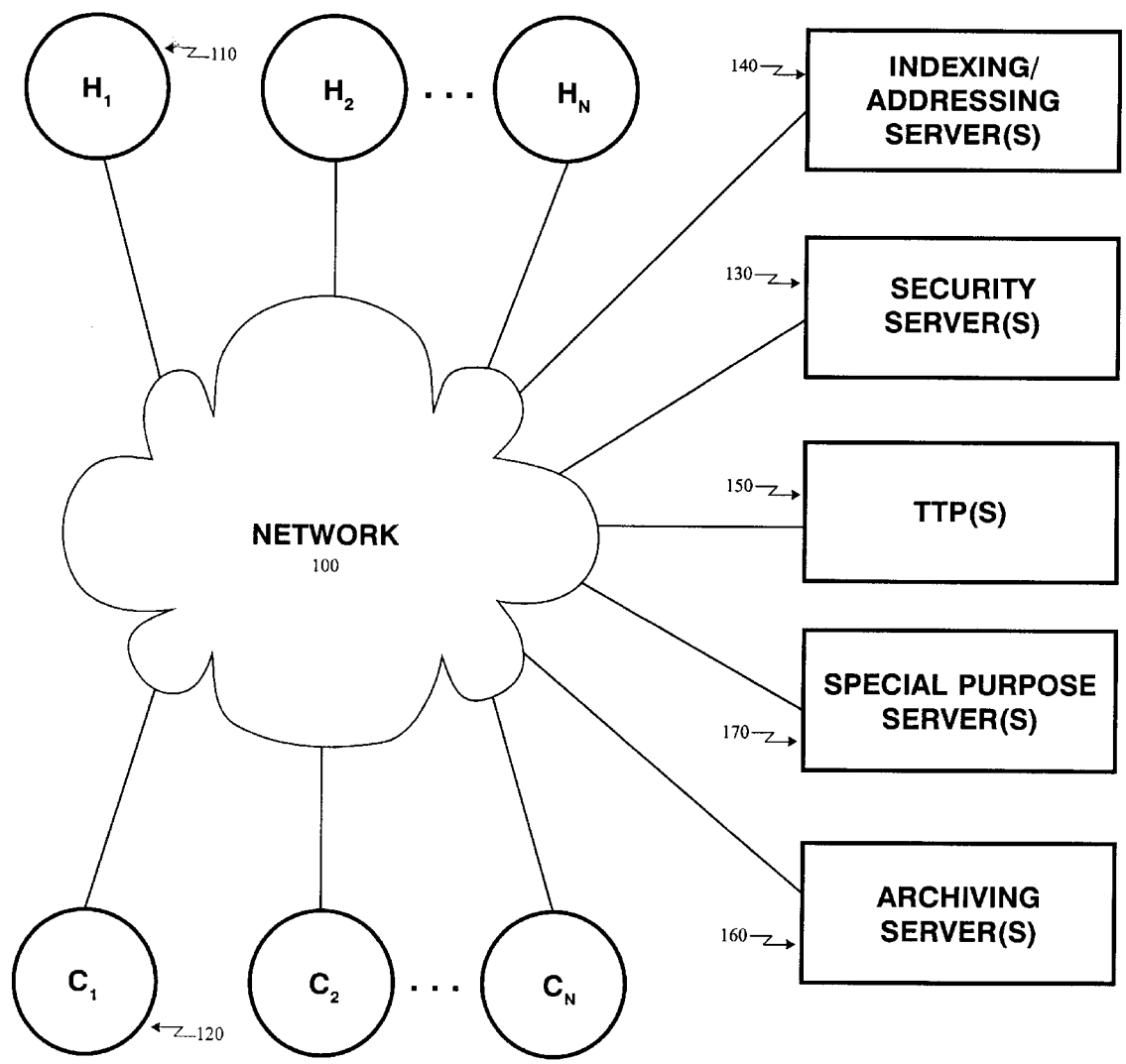
FIG. 1 is a representation of a network, such as the Internet, which is equipped for world wide electronic commerce.

FIG. 1 is a representation of a network (100), such as the Internet, which is equipped for world wide electronic commerce. The network 100 selectively links a variety of users together. Several network users have special functions. Network elements $H_i$ 110 represent a variety of electronic commerce servers. In accordance with the usual practice, a plurality of home pages may be resident on a single computer generally referred to as a web site. Each of the home pages operates as a server for receiving and responding to connections and/or messages from one or more clients $C_i$ (120). Users participating in electronic commerce are logically related in a certification matrix using security servers 130 as set forth more in detail in the Infrastructure application referred to above. In addition, one or more indexing/addressing servers (140) may be found in the network. These servers may constitute white pages or yellow pages directories and generally comply with CCITT recommendation X.500. One or more servers may constitute a trusted third party (TTP) 150 and perform functions such as electronic notary or escrow agent. Archiving server(s) 160 may provide a repository for documenting legal and contractual transactions and/or for maintaining certificate revocation lists as set forth more particularly in the Infrastructure application, referred to above.

The Internet, including its world wide web subcomponents, contain large numbers of technically sophisticated users, some of whom devote their time and efforts to "hacking" into other people's computer systems and gaining access to their information and/or implanting subroutines and viruses, the effects of which range from the humorous to the totally destructive. Thus, the Internet environment, as it currently exists, is not suitable for reliable and secure electronic transactions because of the extreme potential for compromise of credit card numbers and other payment mechanisms and because of the unreliability of information posted to home pages, bulletin boards and the like. Thus, the augmentation of standard Internet environment with security features, as illustrated in FIG. 1, is necessary and desirable in order to facilitate electronic commercial transactions which are free of the problems of the prior art.

Figure 2:
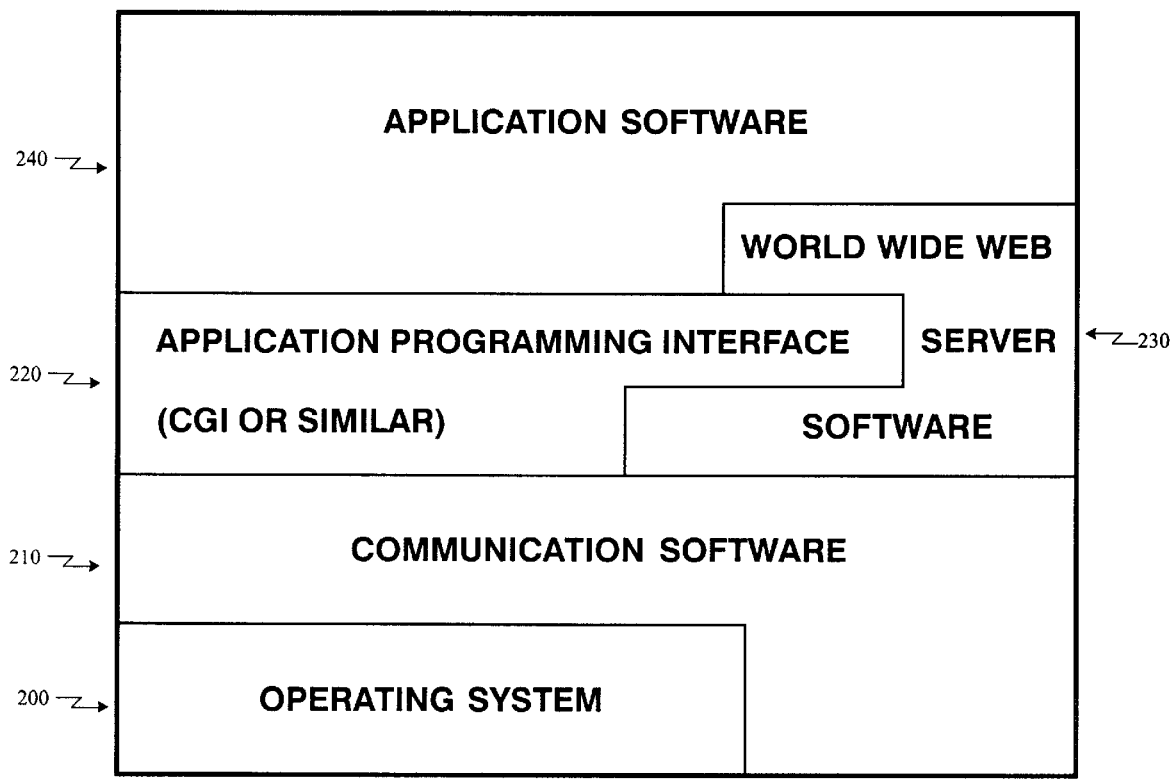
FIG. 2 is a depiction of typical software architecture for a world wide web server.

FIG. 2 is a depiction of a typical software architecture for a world wide web server. At the lowest level, an operating system is utilized to provide high level functionality to the user and to other software. Such an operating system typically includes a BIOS (Basic Input Output System). Communication software 210 provides communications through an external port to a network by either directly invoking operating system functionality or indirectly, bypassing the operating system (as shown on the right of block 210) to access the hardware for communications over the network. Item 220 represents an application programming interface which includes the security primitives set forth in the Infrastructure application, referred to above, as well as card reader primitives as set forth in the Smart Token application referred to above. This allows the user, be it an individual or a software routine, to invoke security and card reading capabilities using a standard consistent interface without concern for how the particular functionality is implemented for each of the primitives. World wide web server software 230 represents any one of several standard commercial packages available for equipping a computer with world wide web server functionality. The server software may be configured to selectively utilize, directly the security and smart token capabilities of the application programming interface or may bypass those capabilities and drive communication software directly. Preferably, the server software accommodates both modes of operation selectively.

The application software 240 represents any number of applications designed to react to incoming messages from clients through the communications port to provide the desired functionality the client seeks. Applications at this level may include those necessary to handle one or more home pages which can be accessed by users of the world wide web server.

Figure 3:
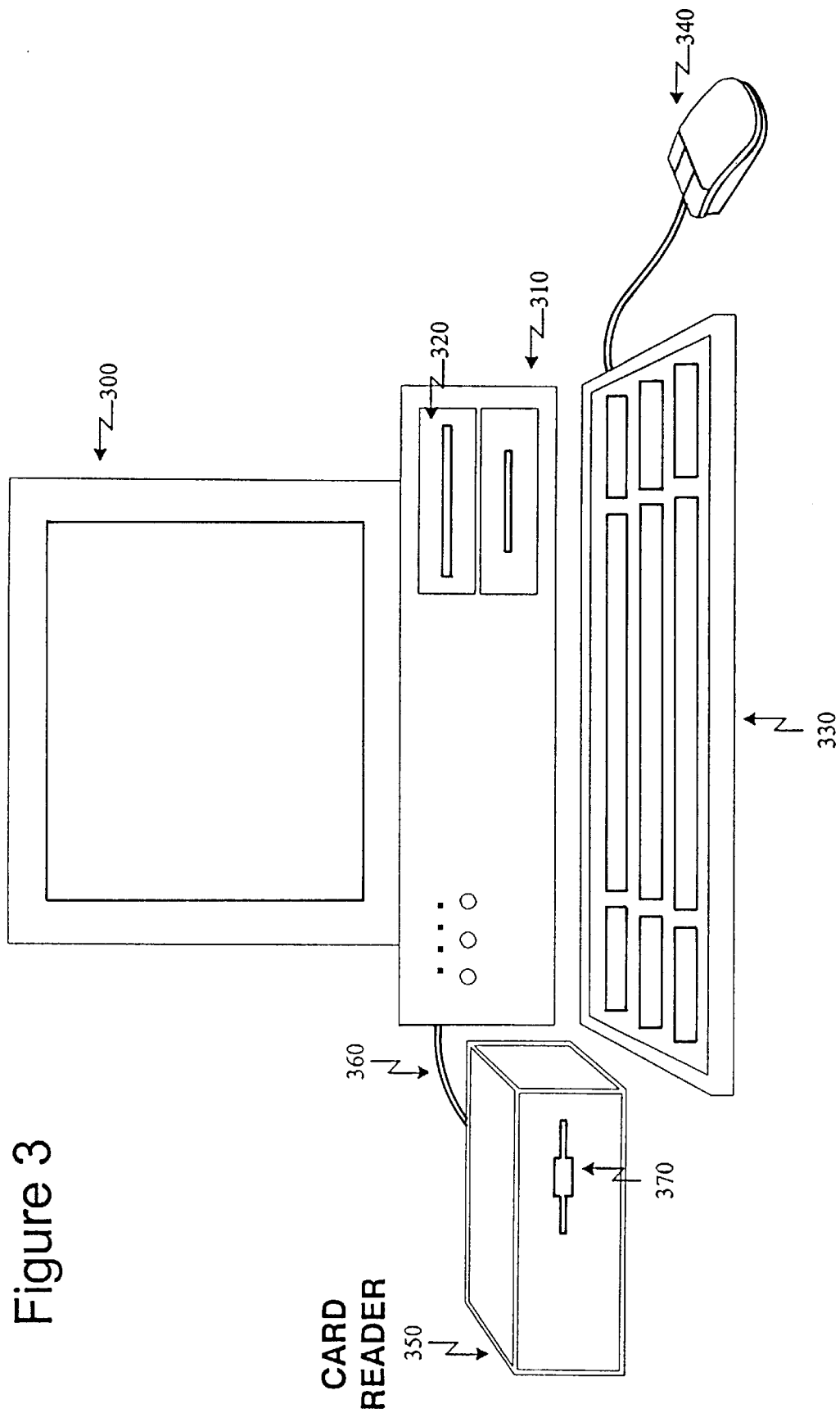
FIG. 3 is an illustration of a computer incorporating smart token hardware which can be used for running either client or server software.

FIG. 3 is an illustration of a computer incorporating smart token hardware which can be used for running either client or server software.

In this exemplary illustration, the computer is equipped with the usual display 300, keyboard 330, mouse 340 and drives 320. In addition, the computer is equipped with card reader 350 which will both read and write smart tokens such as smart cards or PCMCIA cards. Preferably, the cards are smart cards and card readers both read/write smart cards. Although the term "reader" is used, it is to be understood that the term, as used herein, is intended to cover the writing of smart tokens as a necessary and inherent part of a "reader". Card reader 350 is illustrated as connected to the computer over cable 360 which connects to a port on the computer, such as an RS 232 port or via any other port or by a wireless connection.

Card readers may be external devices connected to computers, as illustrated in FIG. 1, or they may be built in to other devices such as CPU 310, telephones, vending machines, or almost any computer equipped device.

Although card reader 350 is equipped with a slot 370 for insertion of a smart card, smart card readers are also available which remotely sense the presence of a smart card in the vicinity of the reader and communicate with the smart card utilizing wireless technologies. In some such remote sensing card readers, the card readers broadcast an RF energy signal which is detected by the smart card and a response is sent from the smart card back to the remote sensing card reader. An interchange of data may then occur in both directions over the wireless link between the smart card and the reader. Some card readers are equipped with a keypad and display.

Figure 4:
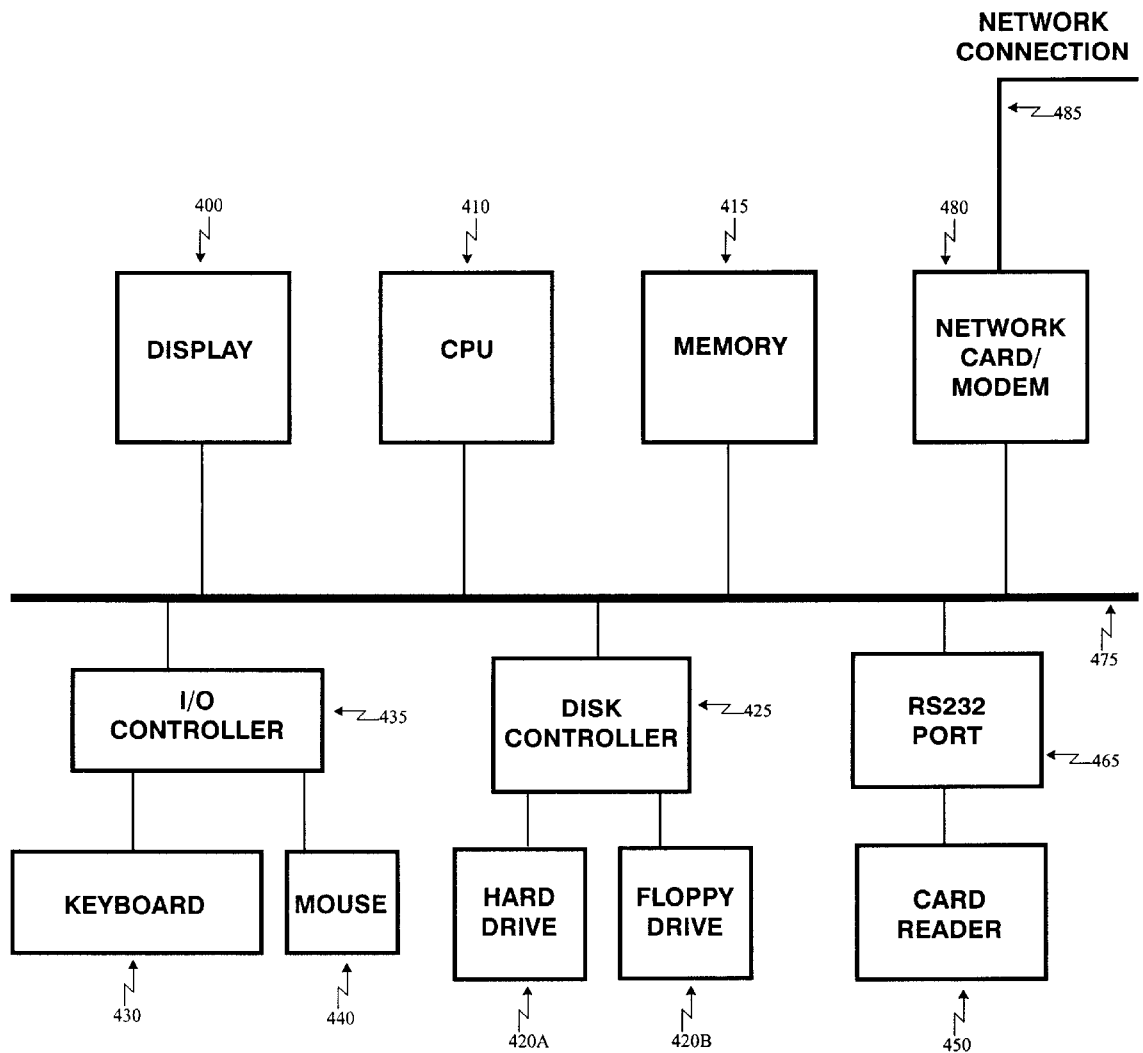
FIG. 4 is a block diagram of an exemplary hardware architecture of the computer of FIG. 3.

FIG. 4 is a block diagram of an exemplary hardware architecture of the computer of FIG. 3. CPU 410, keyboard 430, mouse 440 and card reader 450 all correspond to items shown in FIG. 1. I/O controller 435, disk controller 425, memory 415, RS-232 port 465 and network card/modem 480 are not shown in FIG. 1 but are commonly found in computer systems and are well known. Each of the devices shown in FIG. 2 intercommunicate over bus 475 either directly or over their respective interfaces or controllers.

One type of smart card reader which is preferred is the model Quick Link card reader from Micro Card Technologies. It is a versatile, fast, reliable smart card interface which conforms to ISO 7816 built into a housing fit for desk top use. It has a standard 9-PIN serial interface cable, an AC adaptor, user's manual and software libraries on floppy disk. It connects to a computer via a standard RS 232 serial port. It may function in the MS DOS, MS windows, and Unix environments. Within those environments, the reader may handle a variety of different smart cards. The reader can accommodate new card types as they become available by providing additional libraries.

Typical cards, suitable for use with the invention, which can be accommodated by the Quick Link card reader included the Schlumberger ME 2000 card, the Gem Plus MCOS card family, and the Siemens SLE 44 family of cards.

The Quick Link is also available in an OEM version for integration into other systems in a built-in form. A number of different card acceptors (170 in FIG. 1), which may be either passive, semi-active or active, are available for use with the ACR.

An alternative embodiment of the invention would utilize a PCMCIA card and PCMCIA card reader in lieu of the smart card technology just described.

Figure 5:
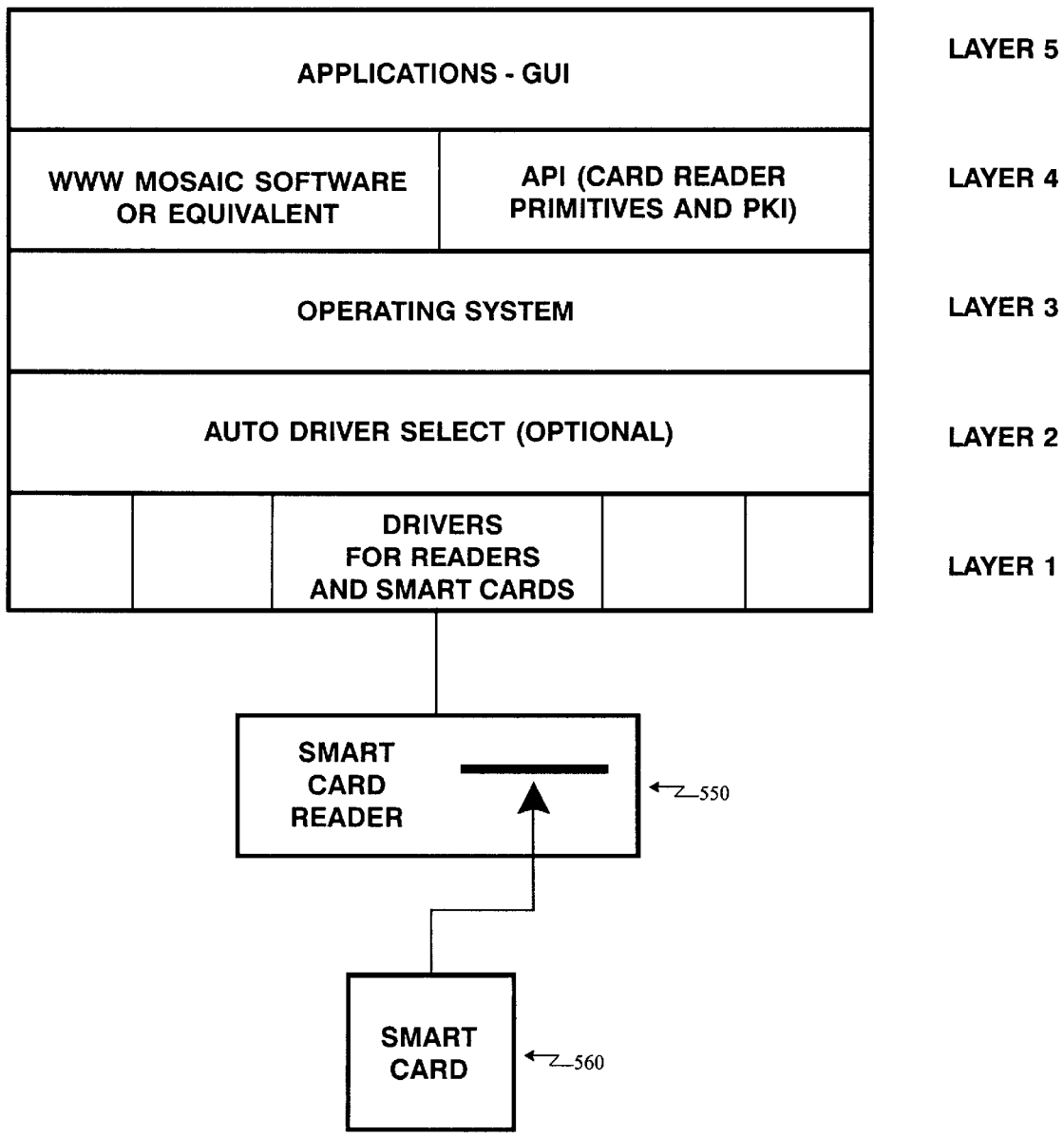
FIG. 5 illustrates the software architecture of a typical client shown in FIG. 1.

FIG. 5 illustrates a software architecture of a typical client shown in FIG. 1. Smart card reader 550 and smart card 560 are shown to illustrate the relationship to the layers of the software architecture. In the software layer closest to the hardware, namely layer 1, a plurality of drivers for different kinds of smart card readers are shown. Preferably, drivers for each of the major manufacturers of smart card readers are installed and the driver for the particular smart card reader in use is selected for handling the interface to the smart card reader.

Layer 2 illustrates automatic driver select software, which, although optional, permits automatic selection of a driver from layer 1 which is compatible with a smart card reader 550 installed in the system. Typically, this selection can be made by sequentially activating drivers in an interrogation/response mode to see which driver is compatible with smart card reader 550 or, alternatively, by checking a configuration file, either generated automatically when the computer boots or generated manually as equipment is installed, which is permanently stored. Thus, automatic driver selection software of layer 2 has a number of possible mechanisms which can be utilized to select the proper driver for interfacing smart card reader 550 with remainder of the system.

Layer 3 represents an operating system. Hardware services are normally provided through calls to the operating system and the drivers are written to be compatible with the operating system in use.

Layer 4 is a standardized application programming interface (API) which permits the applications of layer 5 to have a consistent interface regardless of changes in the underlying smart card technology (including smart card reader 550 and smart card 560). Thus, applications can be developed without regard to the underlying hardware and therefore be transportable from system to system because of the standard application programming interface. The application programming interface illustrated at layer 4 includes not only certain primitives designed for invoking functions of smart card readers directly but aggregations of those primitives, as well, to perform standard higher level functions. The application programming interface preferably includes the application programming interfaces disclosed in the Infrastructure application and in the Smart Token application, both referred to above. Thus, both Smart Token and security functions may be invoked directly and conveniently. The other part of Layer 4 represents world wide web Mosaic Software or equivalent. Thus the application layer can invoke either Mosaic software or the API directly and the Mosaic software can invoke the API functionality as well.

Figure 6:
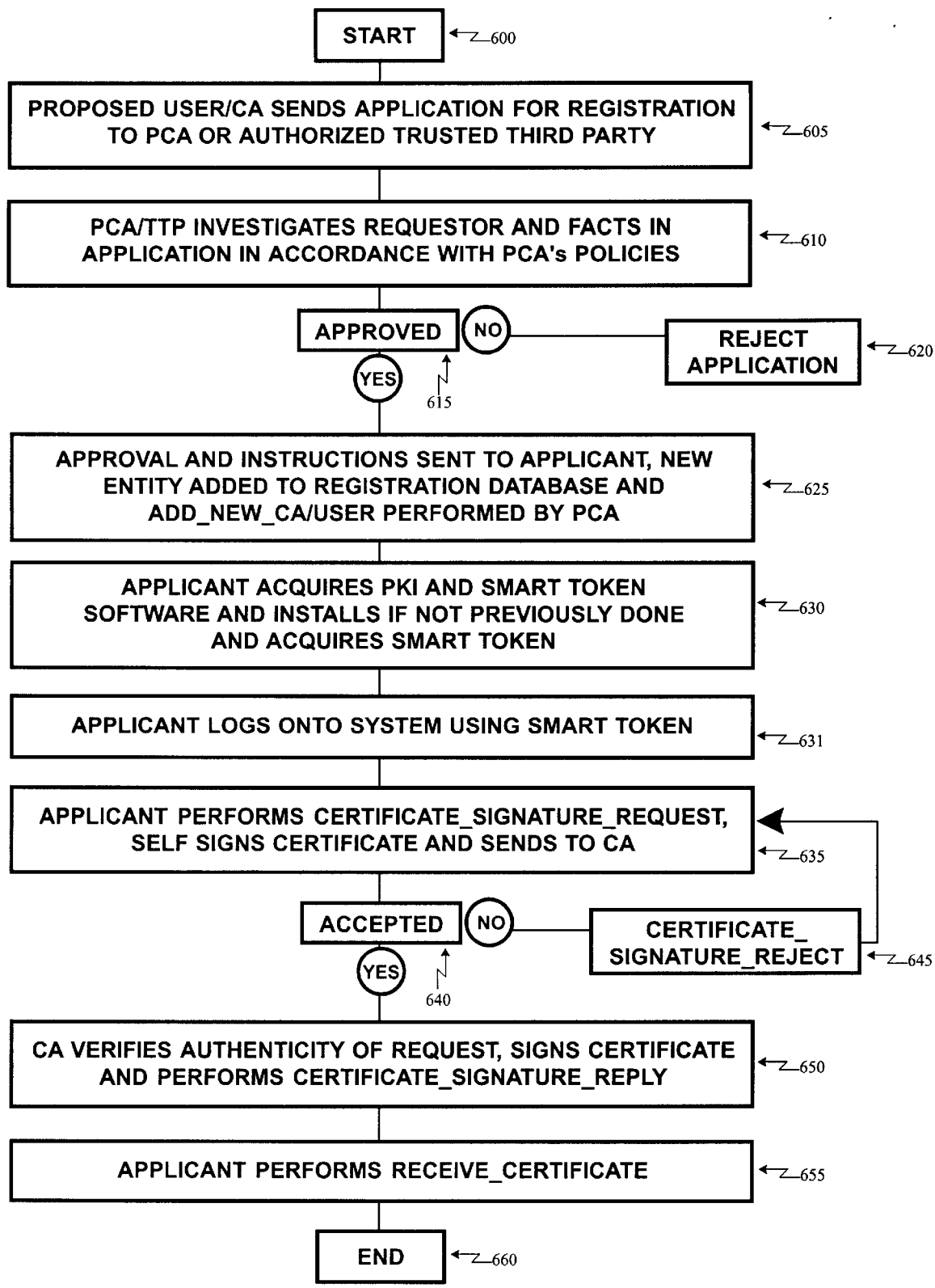
FIG. 6 is a flow chart of a registration and certification process followed by users of the world wide electronic commerce system.

FIG. 6 is a flow chart of registration and certification process followed by users of the disclosed world wide electronic commerce system.

The process starts at 600 and a proposed new user or Certification Authority (CA) sends (605) the application for registration to the policy certifying authority (PCA).

The PCA investigates the requester and the facts in the application in accordance with the PCA's policies (610). If disapproved, a reject message is sent (620) whereas if approved (615) the approval and instructions are sent to the Applicant (625), a new entity is added to the registration data base and the Add_New_CA/User process is performed as set forth in the Infrastructure application. If Applicant has not already acquired the software, the Applicant acquires Public Key Infrastructure (PKI) and smart token software and installs it on his system (630) and acquires a smart token. Applicant then logs on to the system using the smart token. The logon process may use any of the techniques described in the Smart Token application referred to above. Using the software, the Applicant performs the Certificate_Request process, (discussed hereinafter 635), self signs the certificate and sends it to the certifying authority. If the certificate fails certain edit checks (640-N), a Certificate_Signature Reject message is prepared and sent to the Applicant. The Applicant may then again modify the request and submit it as previously indicated at block 635. If the certificate is accepted (640-Y), the CA verifies the authenticity of the request, signs the certificate and performs Certificate_Signature_Reply (650). When the Applicant receives the certificate contained in the Certificate_Signature_Reply message, Applicant performs the Receive_Certificate process (655) and the registration and certification process is complete.

Figure 7:
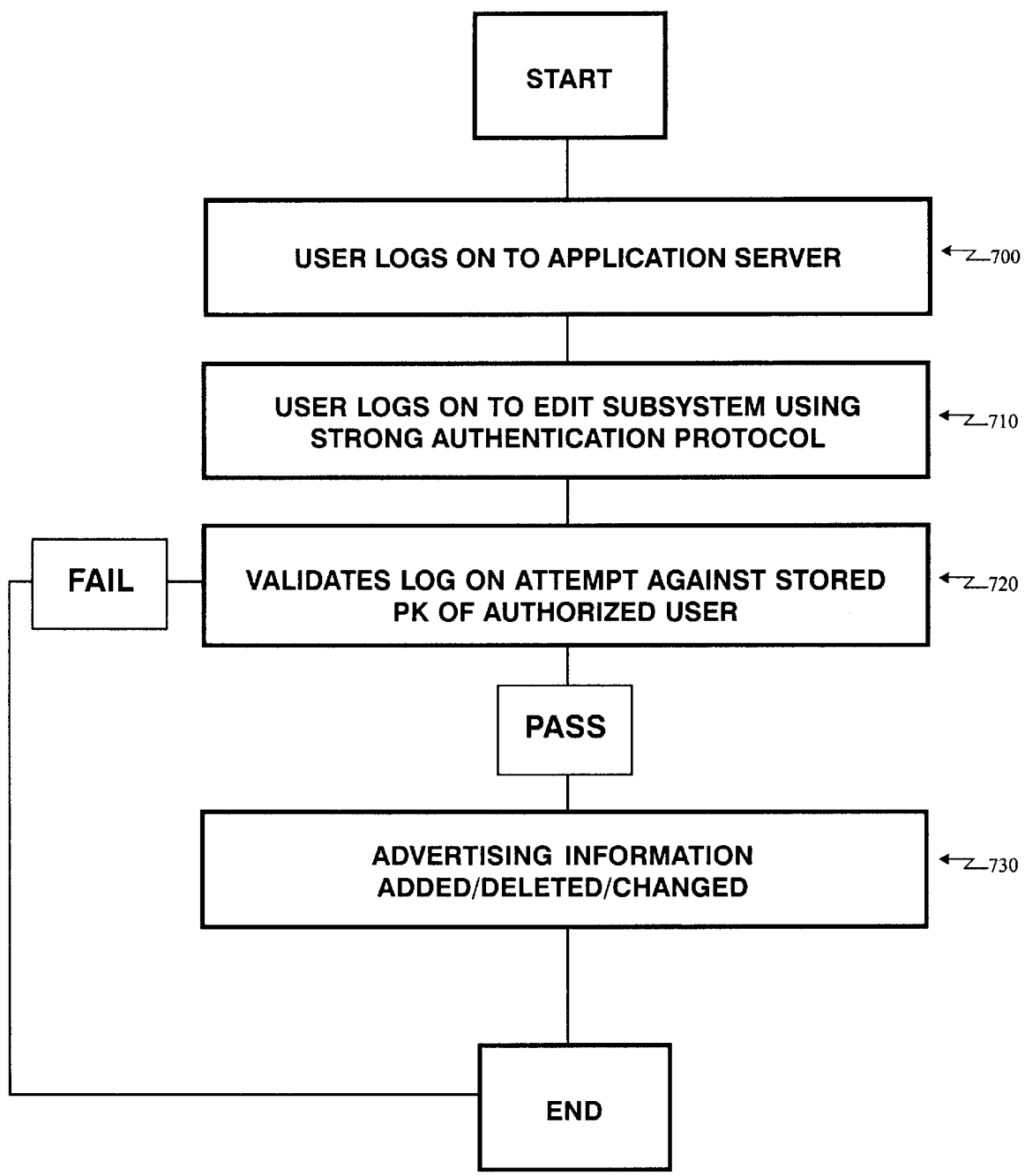
FIG. 7 is a flow chart of a process for loading authentic information into a server.

FIG. 7 is flow chart of a process for loading authentic information into a server. A user logs on (700) to a server. The user logs on (710) to the edit subsystem using a strong authentication protocol (such as that set forth in the Smart Token application referred to above). The strong authentication protocol utilizes a public key certificate for validation of the identity of the station logging on and thus the attempt to logon to the edit subsystem results in a validation of the logon attempt against the stored public key of the authorized user for that application server (720). If the public key test passes (720-P) the information contained in the home page may be edited by addition, deletion or change (730). If the logon attempt does not pass the public key check (720-F), logon to the edit subsystem is not permitted and no change may be made to the information. Typically, a user's public key would be stored in the server at the time the account was set up for the application server and would be accessible for checking by the system. Of course, a strong authentication protocol could be utilized for a server access as well as access to the edit subsystem.

Figure 8:
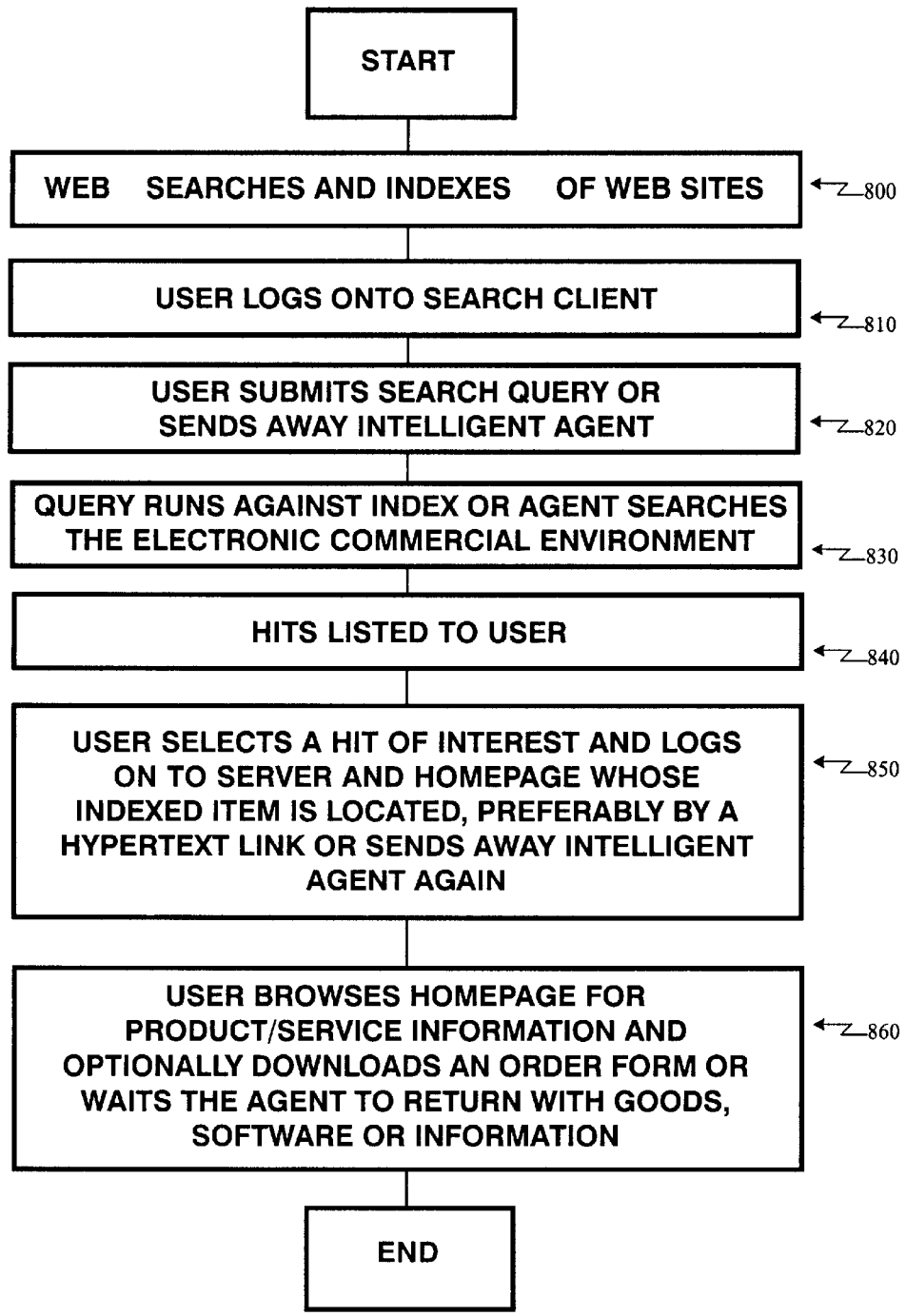
FIG. 8 is a flow chart of a process for searching for desired information using index information generated by a webcrawler.

FIG. 8 is a flow chart of a process for searching for desired information using index information generated by a web crawler. A web crawler is a process which runs on a computer which systematically searches out and indexes (800) the content of servers constituting the universe of web sites. It is an ongoing process which associates at least the name of the server and the titles of documents found there. Typically, individual words (except for noise words) of a document title are placed in an inverted index to enable one to find all documents which contain a particular word or combination of words. To use a web crawler index, a user logs on to the index server (810) and submits a search query (820). The query runs against the index (830) and hits are listed to the user (840). The user selects sequentially, hits of interest, and logs on to the server and home page where the indexed item is located, preferably by activating a hypertext link in the usual manner (850). The user then browses the home page for product/service information and optionally downloads an order form.

Figure 9:
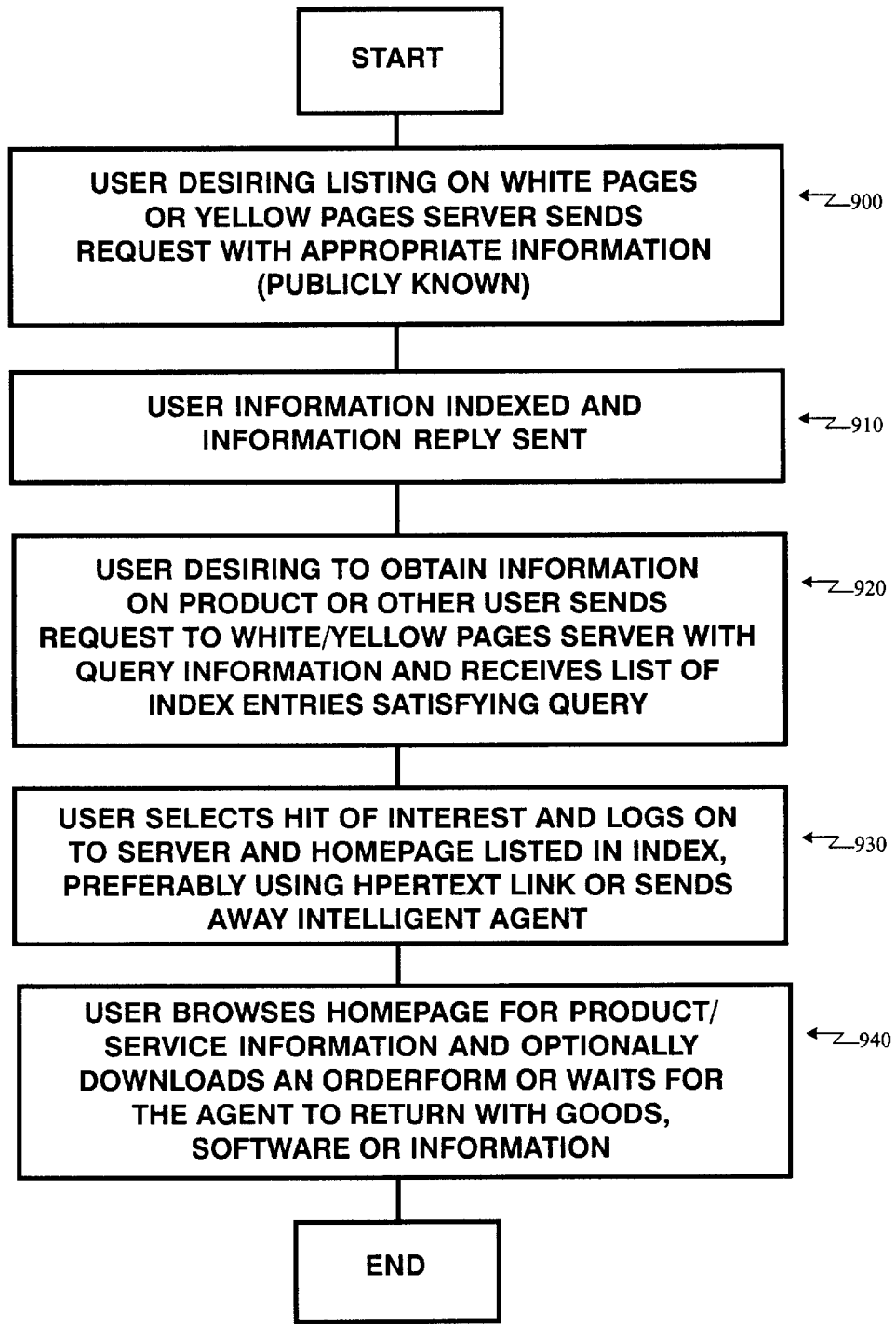
FIG. 9 is a flow chart of a process for searching for desired information using index information found in a white/yellow pages directory.

FIG. 9 is a flow chart of a process for searching for desired information using index information found in a white/yellow pages directory. A user desiring listing on a white pages or yellow pages server sends a message requesting addition to the server with the appropriate information in a publicly known format (900). Assuming the format is correct, the user information is indexed and a confirmation reply message sent to the user (910). A different user searching to obtain information on products, services or on the other user, sends a request to the white/yellow pages server with query information and receives a list of index entries satisfying the query (920). The user selects the hits of interest and logs on to the server and home page listed in the index for the hit of interest, preferably using a hypertext link (930). Once logged on to the indicated server, the user browses the home page for product/service information and optionally downloads an order form (940).

Figure 10:
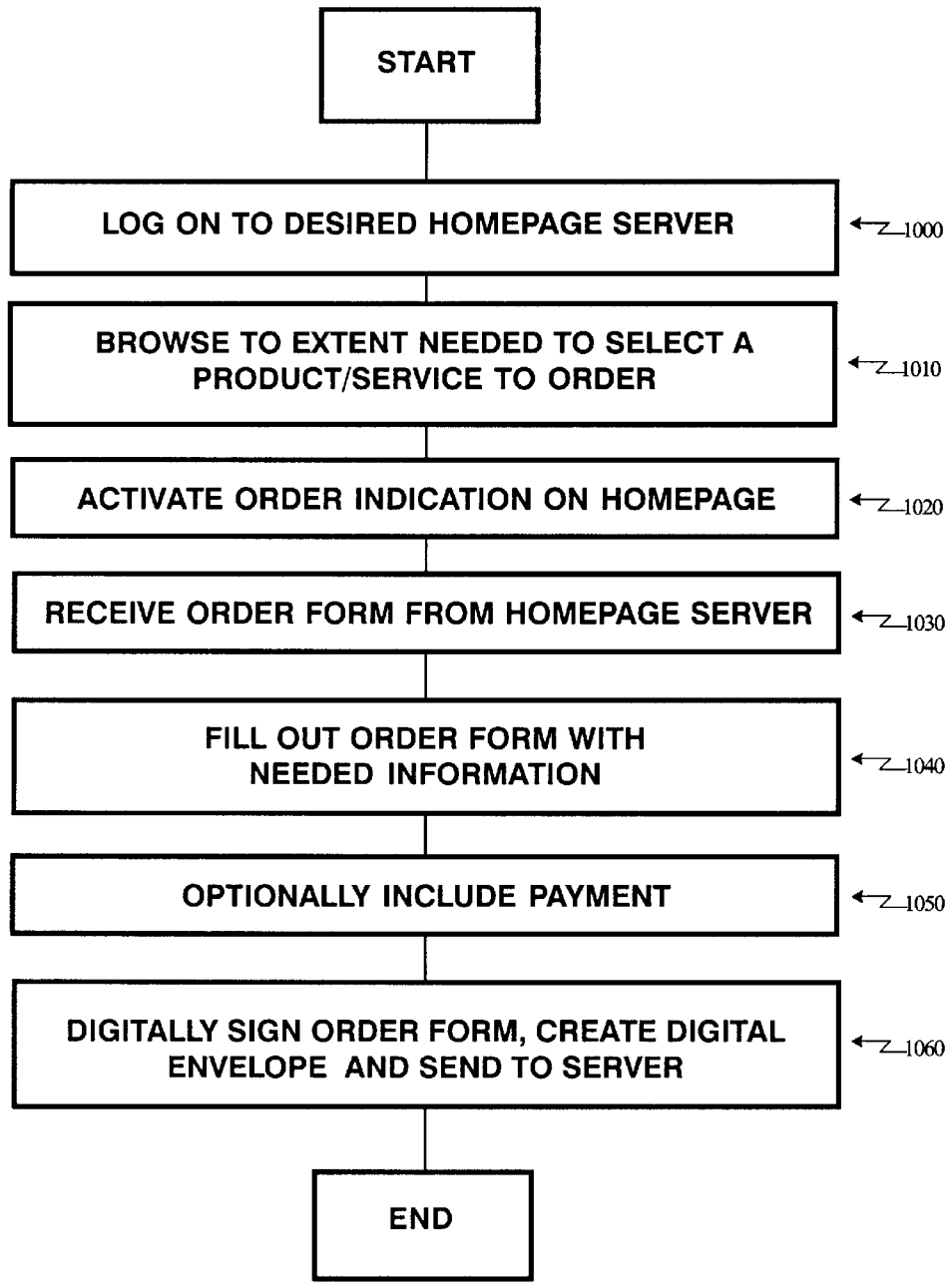
FIG. 10 is a flow chart of a process for placing an order.

FIG. 10 is a flow chart of a process for placing an order. The user logs on to a desired home page server identified in the manner described above (1000) and browses to the extent needed to select a product or service to order (1010). The user obtains an order form by either downloading it or by activating an order indication on the home page (1020) and fills out the order form with the needed information (1040). Optionally, payment may be included using one of the methodologies discussed hereinafter (1050). The user digitally signs the order form and sends it to the server or directly to the vendor as specified in information contained on the server (1060).

Figure 11:
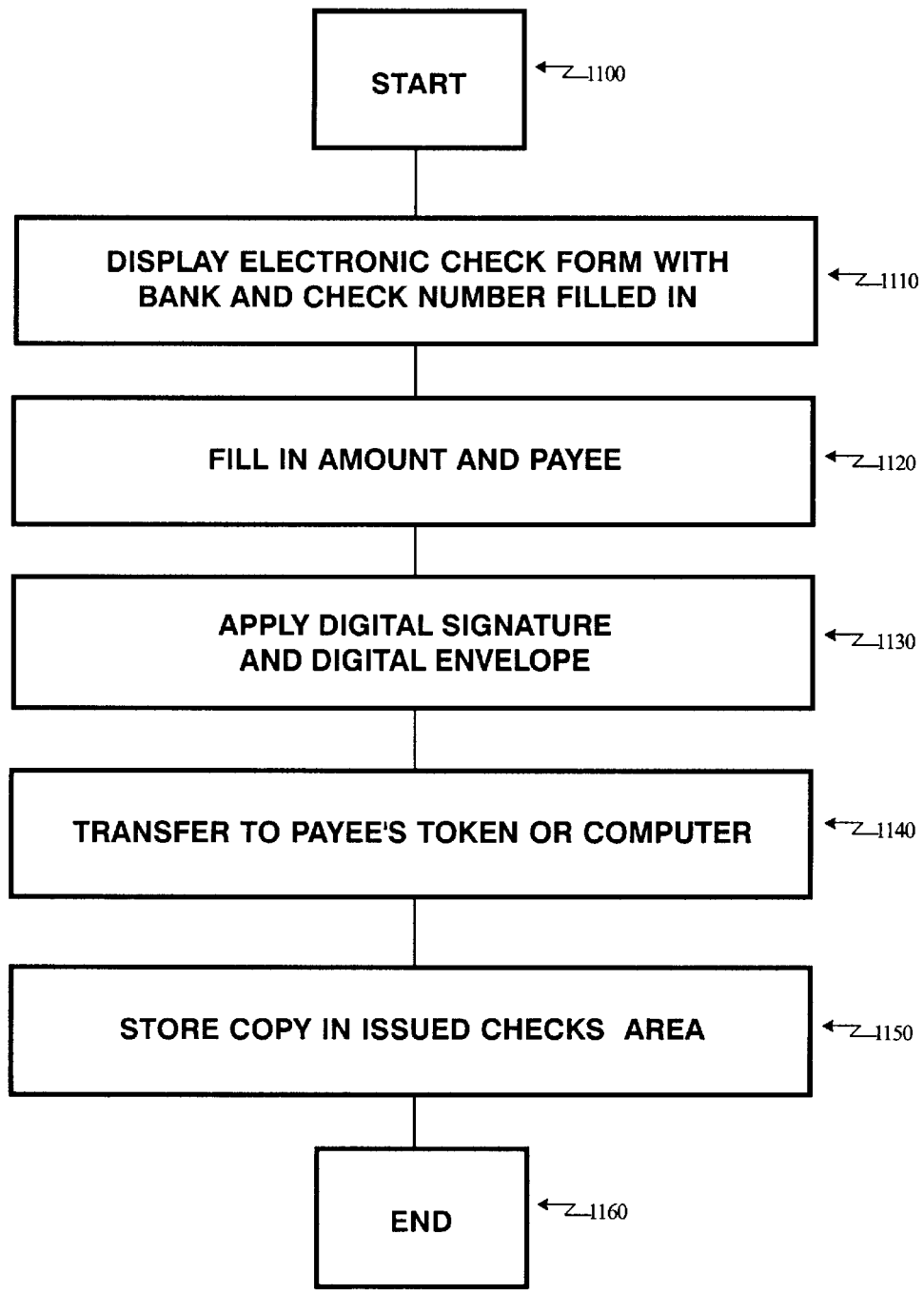
FIG. 11 is a flow chart of a Write_Check process.

FIG. 11 is a flow chart of a Write_Check process. The process starts (1100) with display of an electronic check form with bank and check number filled in (1110). The user fills in the amount and the payee (1120) applies a digital signature (1130). The electronically signed check is transferred to a payee's computer using e-mail or some other form of communications (1140), and a copy of the signed check is stored in the issued checks area (1150) of the domain of the smart token and the process ends.

Figure 12:
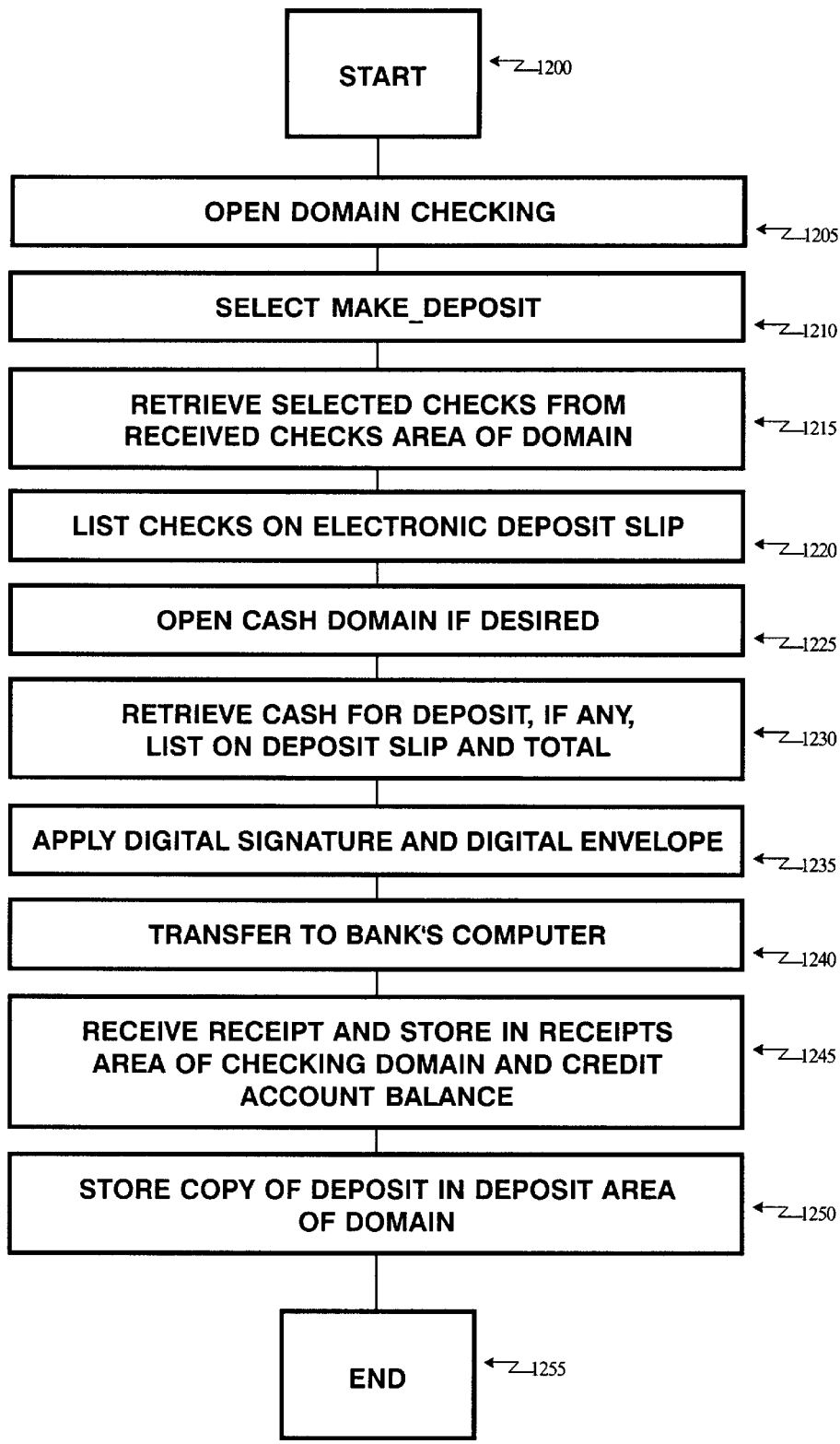
FIG. 12 is a flow chart of a Make_Deposit process.

FIG. 12 is a flow chart of an electronic Make_Deposit process. The process begins at 1200 and the checking domain of a smart token is opened (1205). The function Make_Deposit is selected (1210), and the checks from the received checks area of the domain area are retrieved (1215) and listed on an electronic deposit slip (1220). If cash is to be deposited, the Open_Domain process is invoked with respect to the cash domain (1225) of the smart token and cash is retrieved for deposit, if any, and listed on the deposit slip. All items for deposit are totalled (1230) and the deposit slip is signed using a digital signature (1235). If the bank issues a separate receipt for the deposit, that receipt is received and stored in receipt area of the checking domain and the account balance credited with the amount of the deposit (1245). A copy of the deposit is conveniently stored in the deposit area of the domain (1250) for later reference in reconciling the account or for analysis. If the bank's methodology is to return a signed copy of the deposit as an indication of receipt, steps 1245 and 1250 may be combined and the signed copy of the deposit stored in the deposit area of domain and the process ends.

Figure 13:
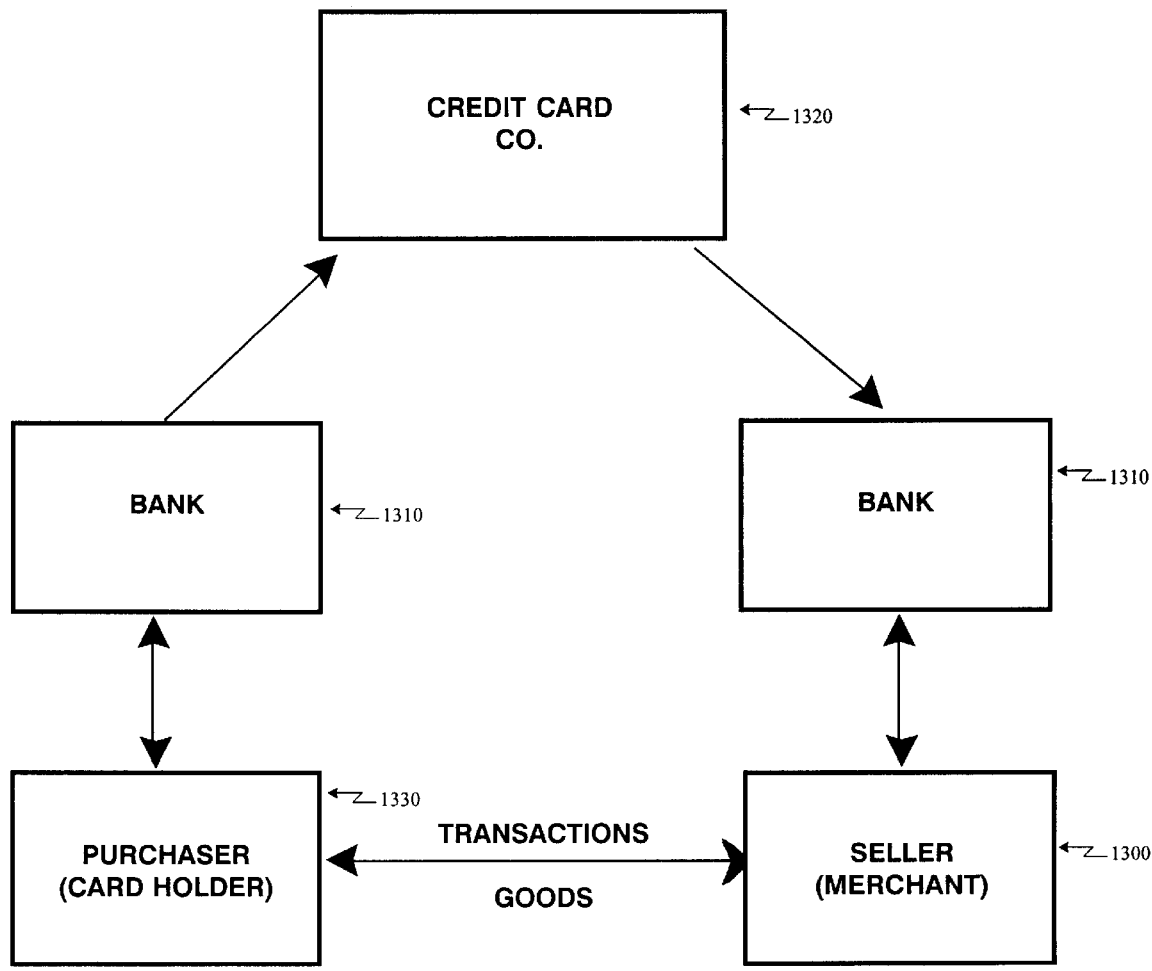
FIG. 13 is a representation of an electronic credit card transaction.

FIG. 13 is a flow chart of a credit card transaction. In a normal cash transaction, the purchaser gives cash to the seller in exchange for goods and a receipt. A credit card transaction is similar in that the seller (1300) provides goods and a receipt, but payment is made through the intermediary of a bank (1310) and a credit card company (1320). The purchaser and the credit card company have a relationship by which the credit card company extends a line of credit to the purchaser. When the purchaser wishes to make a purchase using the credit card, the purchaser essentially promises to pay the credit card company the amount of the invoice, albeit at a later time. The seller, on the other hand, desires immediate cash. The seller exchanges the credit card slip for the face amount less a service fee. Thus, the seller gets immediate cash while the purchaser is not required to pay immediately, but nevertheless receives the goods at the time of the transaction.

Figure 14:
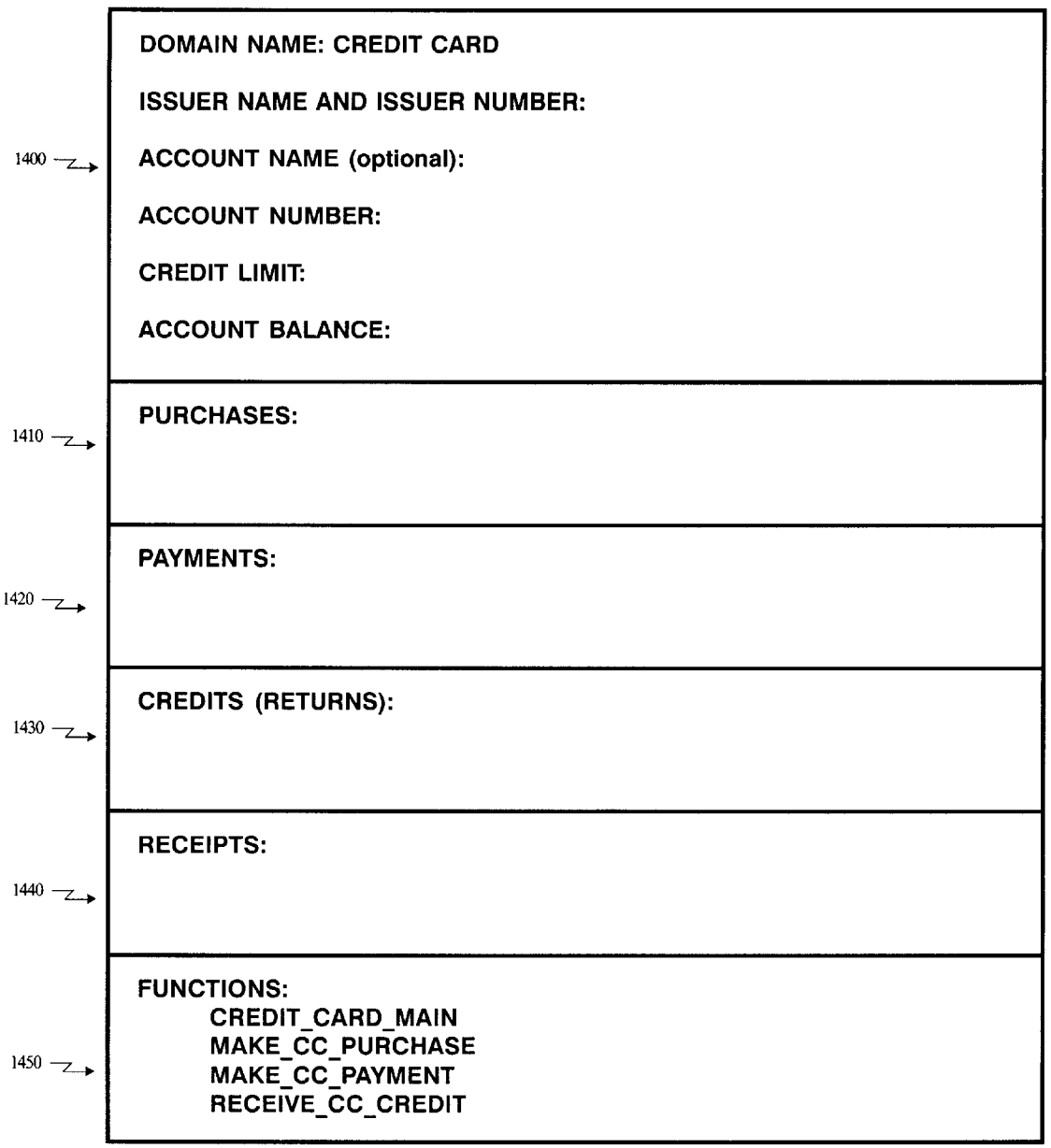
FIG. 14 is an exemplary layout of a Credit_Card domain.

FIG. 14 is an exemplary layout of a Credit_Card domain of a smart token.

Block 1400 contains identifying information about the credit card company, the account name and number, the credit limit and the account balance. Area 1410 represents a list of purchases in corresponding amounts. Item 1420 contains a list of payments made to the credit card company on account. Item 1430 represents a list of returns or credits resulting from undoing all or part of a sale either by returning goods purchased or by rejecting services provided. Item 1440 is an area for storing receipts from the seller for later use. Item 1450 contains a list of the names of functions or processes utilized in conjunction with this domain.

Figure 15:
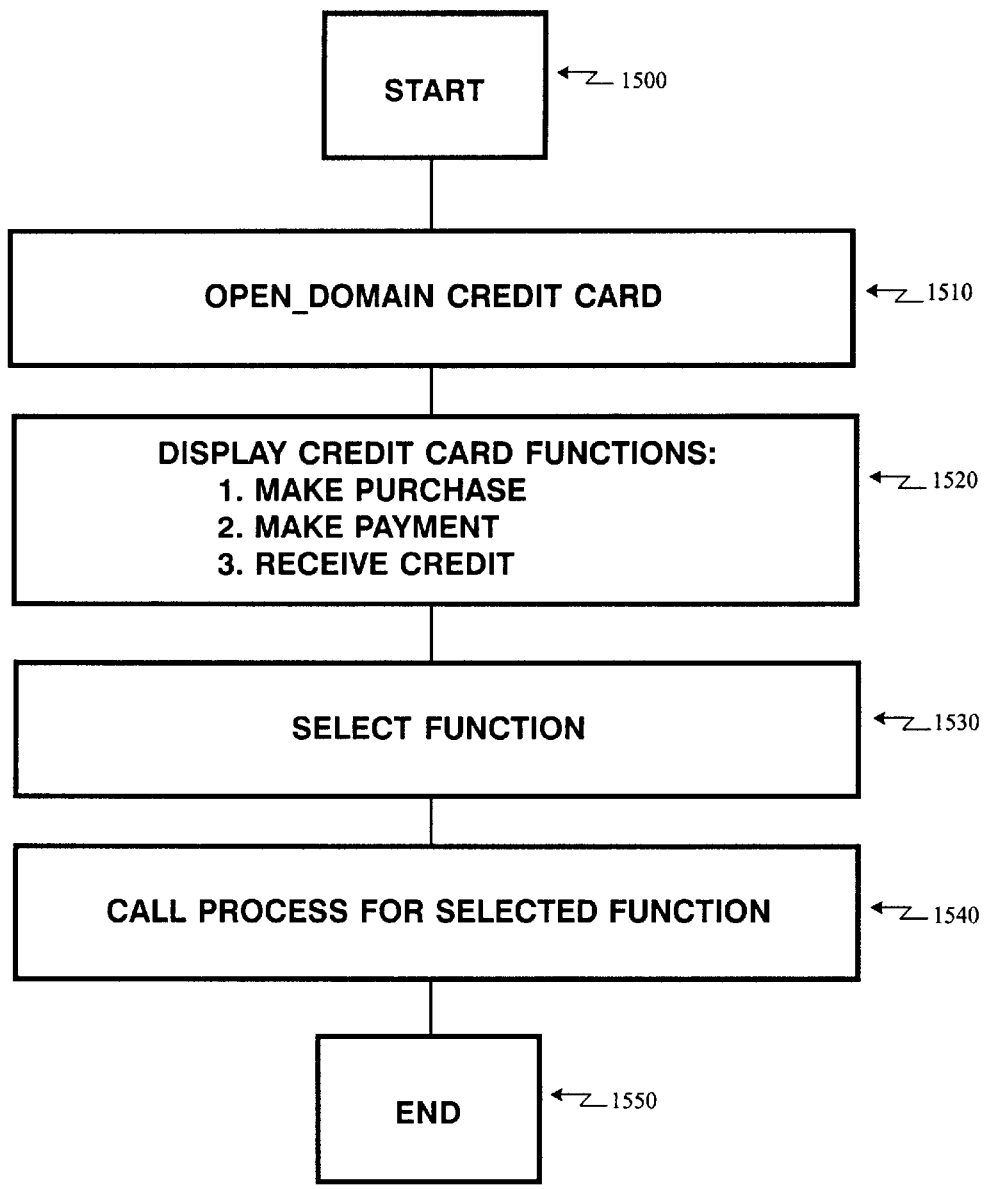
FIG. 15 is a flow chart of a Credit_Card_Main process.

FIG. 15 is a flow chart of a Credit_Card_Main routine which permits selection of one of several credit card functions and requires no further comment.

Figure 16:
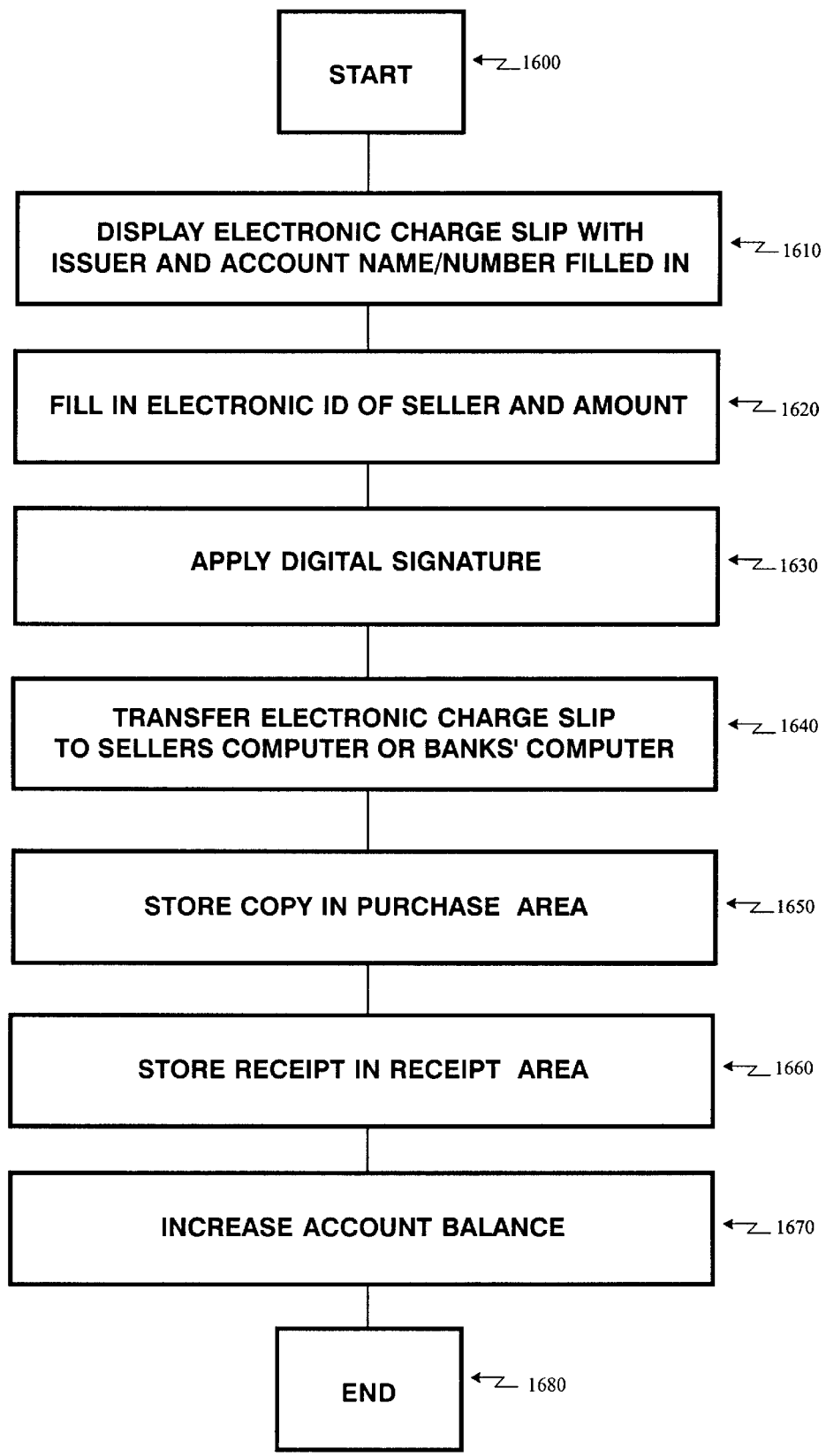
FIG. 16 is a flow chart of a Make_CC_Purchase process.

FIG. 16 is a flow chart of a Make_Purchase process using a credit card domain of a smart token. The process begins (1600) and an electronic charge slip with issuer and account name/number filled in is displayed (1610). The user fills in the electronic ID of the seller and the amount (1620) and applies a digital signature (1630). The electronic charge slip is transferred to the seller's computer (1640) and a copy is stored in the purchase area (1650). An electronic receipt, electronically signed by the seller is returned, optionally, and is stored in the receipt area of the domain. The account unpaid balance is then increased by the amount of the purchase (1670) and the process ends.

Figure 17:
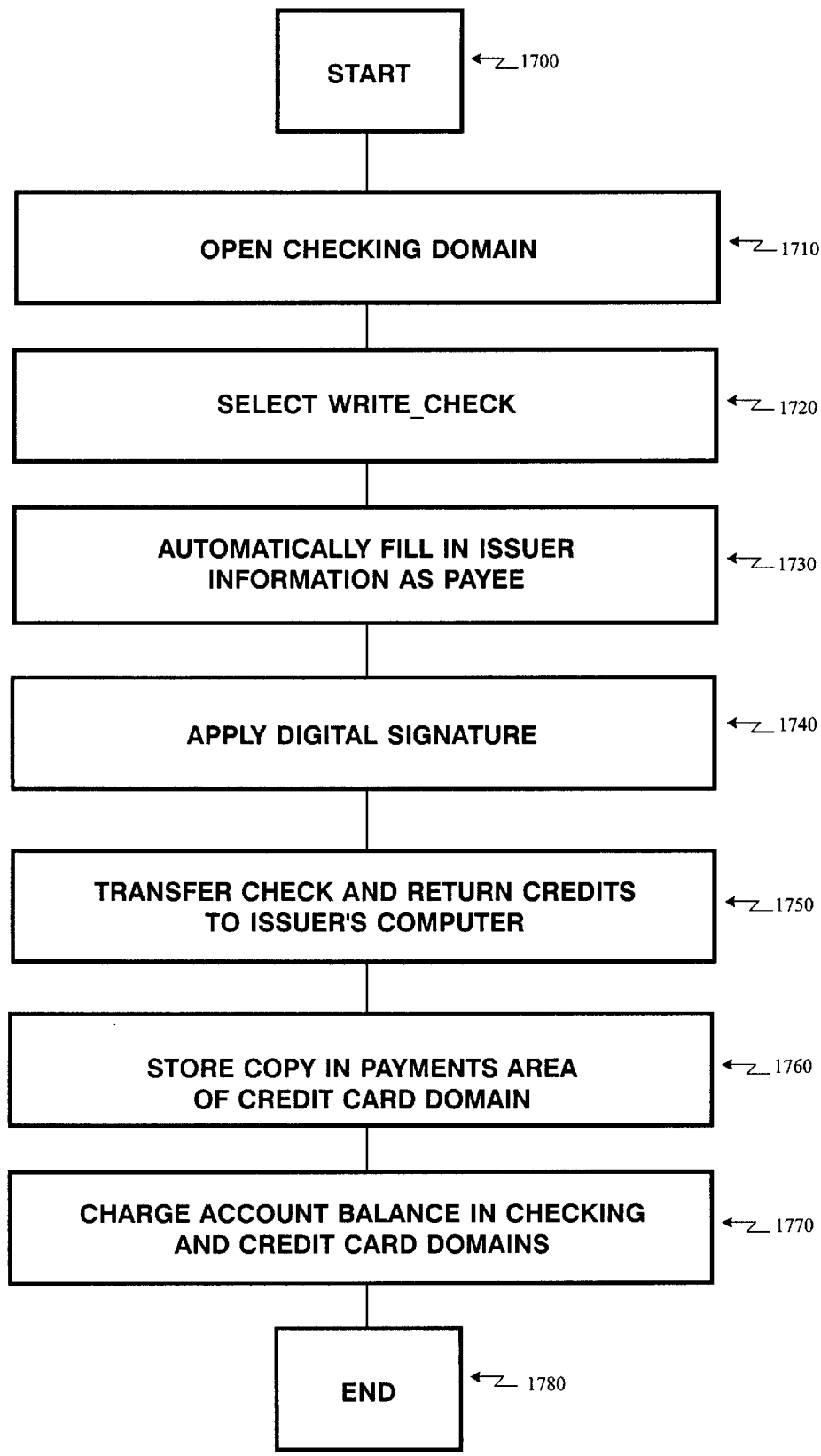
FIG. 17 is a flow chart of a Make_CC_Payment process.

FIG. 17 is a flow chart of a Make_CC_Payment process using a credit card domain of a smart token. The process begins (1700) and the checking domain is opened (1710) and the function Write_Check (1720) is selected. Since the credit card domain is open as well as the checking domain, the payee information may be read from the credit card domain and filled in into the payee location in the check form in the checking domain (1730). The check is signed with a digital signature (1740) and the electronic check together with any return credits are transferred to issuer's computer (1750) and a copy is stored in the payments area of the credit card domain (1760). The account balances in checking and credit card domains are adjusted by the amount of the payment (1770) and the process ends.

Figure 18:
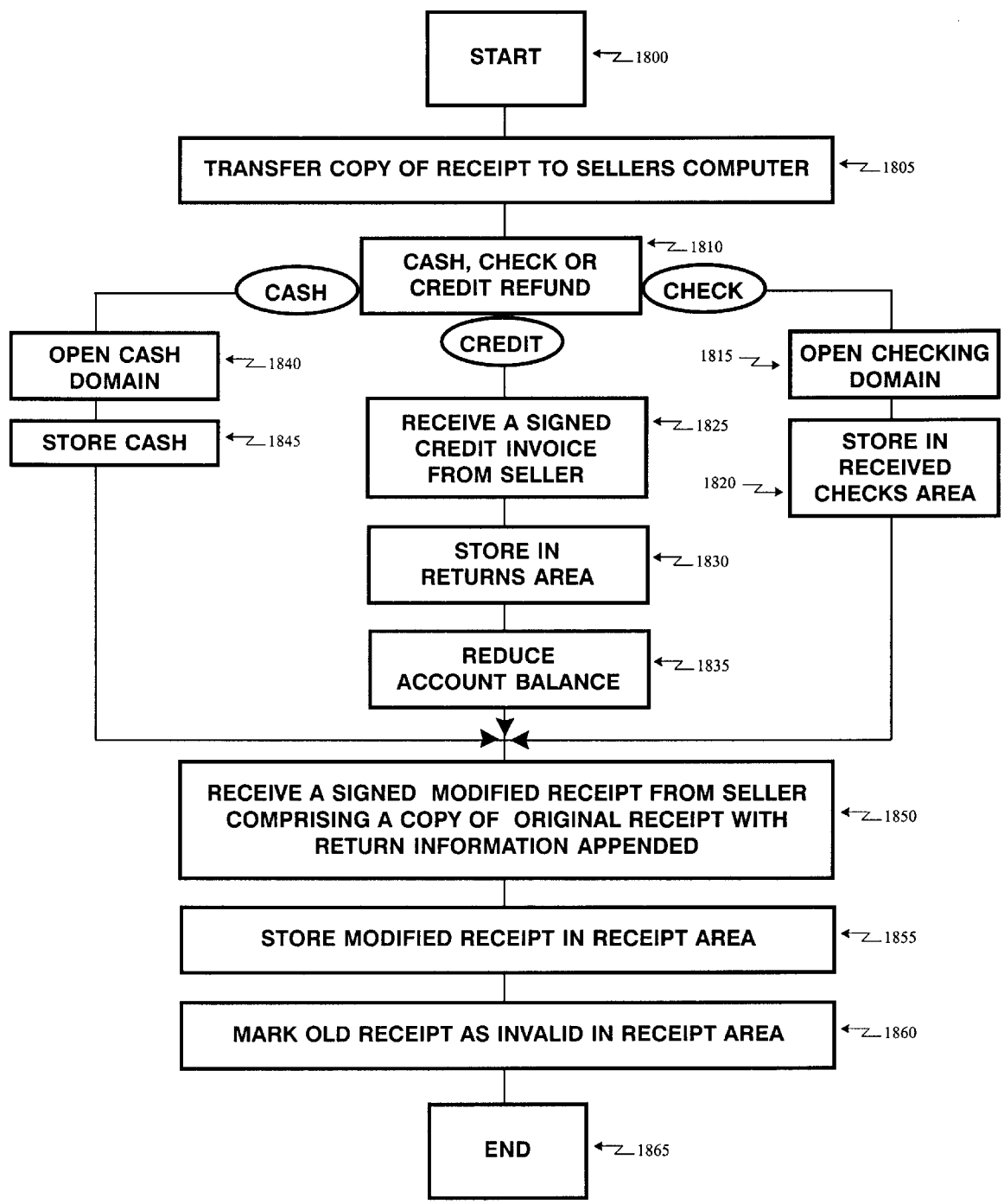
FIG. 18 is a flow chart of a Receive_CC_Credit process.

FIG. 18 is a flow chart of a Receive_CC_Credit process. The process begins (1800) and a copy of a stored receipt from the credit card domain is transferred to a seller's computer (1805). The type of refund to be received is determined (1810) and one of three branches of the process is taken depending on whether the return is cash, credit or check. If it is check, the checking domain is open (1815) and the electronic check for the return amount is stored in the area of received checks (1820). If the return is by way of credit memo, an electronically signed electronic credit invoice is received from the seller (1825) and stored in the returns area of the credit domain (1830) and the account balance for that domain is reduced (1835). If the return received is electronic cash, and the cash domain is open (1840) and the cash stored (1895). After the credited amount is transferred back to the user, the user will receive a signed, modified receipt from the seller comprising a copy of the original receipt with the return information appended (1850). The modified receipt is stored in the receipts area of the domain where the transaction originated (1855) and the old receipt is marked as invalid in view of the modified receipt (1860) and the process ends.

Public key encryption enables one to create the electronic equivalent of money. A customer can go to the bank with a smart token, and, instead of filling out a withdrawal slip and exchanging it for three one hundred dollar bills, the customer can create an electronic withdrawal form which he fills out and signs with his secret key. The withdrawal form is transferred to the bank's computer where the bank verifies it using the token holder's public key. If, instead of returning one hundred dollar bills to the token holder, the bank were to take an electronic form by which it promised to pay to the bearer one hundred dollars and then sign that electronic token using the bank's private key, customers and merchants could verify the signed money orders using the bank's widely published public key.

A one hundred dollar bill is not much different from the signed money order referred to in the preceding paragraph. A hundred dollar bill contains indicia of authenticity in the form of a counterfeit resistant design and authorized signatures. If, instead of a bank, the U.S. Treasury were to issue electronic certificates signed by the U.S. Treasury's private key, these electronic certificates could be transferred from user to user just like one hundred dollar bills.

There are two types of digital cash. One is called identified digital cash and the other is anonymous digital cash. Identified digital cash contains information revealing the identity of the person who originally withdrew the money from the bank. Identified digital cash has a disadvantage that, like credit cards, it enables the bank to track the money as it moves through the economy.

Anonymous digital cash works just like paper cash. Once anonymous digital cash is withdrawn from the bank, it can be spent without leaving a transaction trail. Anonymous digital cash is created by using numbered bank accounts (that is, a bank account with only a number for identification and not the name and address of the owner) and blind signatures. Blind signatures are discussed in the August, 1992 edition of *Scientific American* at pages 96–101.

There are two other ways of categorizing digital cash. On line digital cash requires one to interact with the bank via modem or network to conduct a transaction with a third party. Off line digital cash can be transferred to a third party without directly involving a bank.

Off line, anonymous digital cash is the most complex form of digital cash because of the double spending problem. The double spending problem occurs because electronic monetary certificates can be copied very easily. Therefore, if one has a one hundred dollar certificate signed by a bank, it could be reproduced one hundred times and spent one hundred times. On-line digital cash systems prevent double spending by requiring merchants to contact a bank's computer with every sale. The bank maintains a data base of all the spent pieces of digital cash and can easily indicate to the merchants if a given piece of digital cash is still spendable. If the cash has already been spent, the merchant refuses the sale in a way similar to the way credit cards are currently verified.

There are at least two ways of overcoming the double spending problem with respect to electronic money. One way is to embed a special tamper proof chip into the smart card which would detect the attempt and would not permit the transaction.

The other way involves arranging the cryptographic protocols so that if a piece of cash is double spent, the act of double spending provides enough information that the double spender can be identified. Digital cash systems can accumulate the complete path that the digital cash has made through the economy. That is, the particulars of each transaction are appended to the piece of digital cash and travel with it as it moves from person to person. When the cash is finally deposited, the bank will check its data base to see if the piece of digital cash was double spent.

With off-line anonymous digital cash, if the digital cash was double spent, the information accumulated along the way, now accessible by virtue of the double spending, will identify the double spender. In this way, the identity of the spender is revealed only if the cash is double spent. If the cash is not double spent, the bank cannot determine the identity of the original spender nor can it reconstruct the path the cash took through the economy.

It is clear that some of the essential properties of electronic money tokens are:

1. monetary value,
2. exchangeability,
3. retrievability, and
4. tamper resistance.

Other desirable properties of electronic monetary tokens are divisibility, traceability, and the ability to make cash purchases in a convenient and easy manner.

The ability to link a smart token to its owner in ways that no one but the owner can use it, is an important characteristic of the system of the invention. As suggested above, any number of biometric measures may be utilized as a key to prevent anyone other than the actual owner from opening and accessing a smart token containing digital cash. Thus, in addition to the usual logon ID and password protection, a fingerprint comparison between the person attempting to open the token and one or more stored fingerprints could be necessary to access the contents of the token. A retinal scan is another method that could be used.

Another convenient feature of smart token digital cash is that most people could and probably would keep back up copies of their electronic bank notes, keys and other data. Thus, they could recover their funds if their token were lost or stolen. If stolen, the biometric links that prevent use of the token, and if lost, the back up copy is indistinguishable from the original.

Another characteristic of electronic money is that a variety of restrictions and limitations on use can be imposed. For example, if money were earmarked for educational expenses, the identifications of institutions where such money might be spent could be imposed as a restriction on the spendability of the electronic money. Therefore, a student at Anywhere University could spend the money at the bookstore at the university or at the university dining halls, but not at pool halls.

FIG. 19 is a representation of an exemplary layout for an electronic cash domain.

Block 1900 contains domain definition information as in the other domains. In this case, the current value field contains a summation of all certificates, such as that shown in FIG. 1910 converted, using conversion values from the nationality stated to a desired currency value.

In the exemplary layout, a certificate includes the issuer name and issuer number, typically a bank name and bank number or the name and banking identification number of the national bank of the nation issuing the currency. The nationality is specified. The particular certificate illustrated in block 1910 is a certificate which can be divided into pieces and spent one piece at a time. Thus, the original amount might have been a hundred dollar bill which was issued by some bank and the history section of block 1910 lists the amount, transferee and data and time of expenditure of pieces of the electronic currency spent to date. The amount remaining field is therefore a difference between the original amount the summation of the amount spent to date.

Block 1920 provides an area for convenient tracking of cash expenditures which will remain after the certificate listed in 1910 is exhausted or transferred. As before, blocks 1930 contain a list of functions associated with this domain, only two of which are shown for exemplary purposes, namely, Get_Cash and Pay_Cash.

Figure 20:
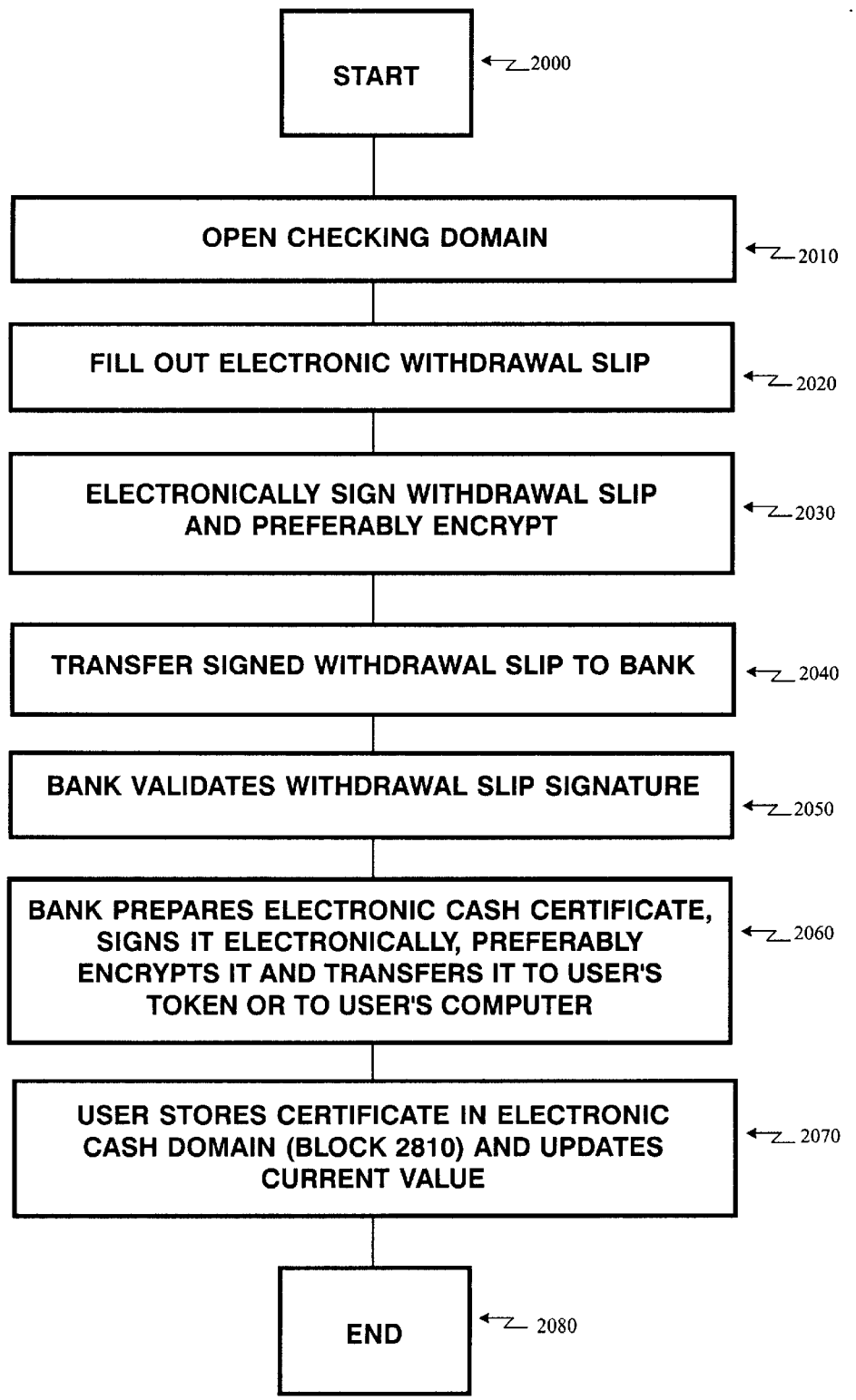
FIG. 20 is a flow chart of a Get_Cash process.

FIG. 20 is a flow chart of a Get_Cash process.

The process begins and a checking domain is opened (2010), an electronic withdrawal slip is filled out (2020), signed electronically (2030) and transferred to the bank (2040). The bank validates the withdrawal slip signature (2050) and prepares an electronic cash certificate which it signs electronically (2060) and transfers it to the user's token or to the user's computer for transfer to the user's token. The user stores the electronic cash certificate from the bank in the electronic cash domain (block 2010) and updates the current value (2070) and the process ends.

Figure 21:
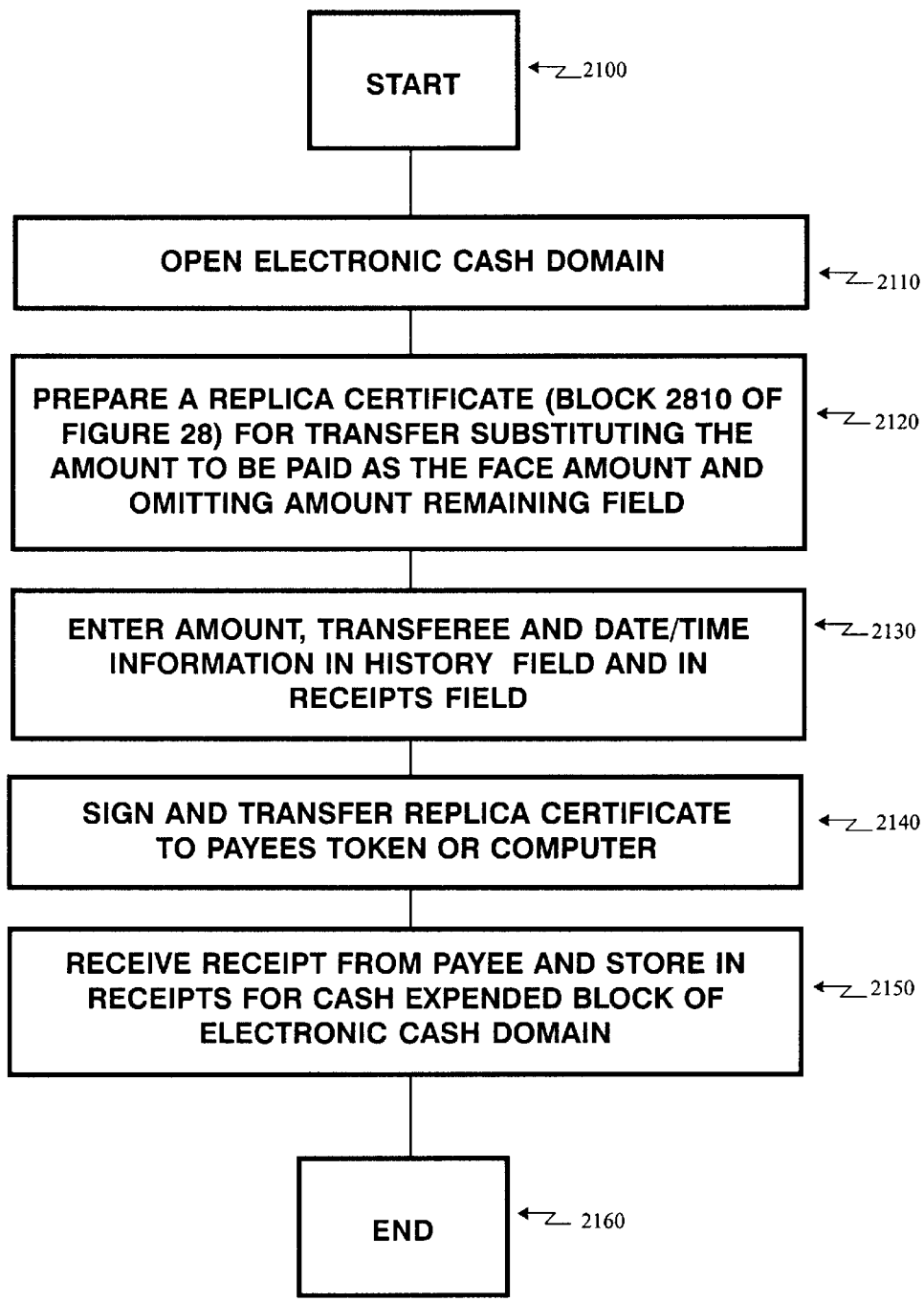
FIG. 21 is a flow chart of a Pay_Cash process.

FIG. 21 is a flow chart of a Pay_Cash process.

The process begins and Electronic_Cash domain is opened (2110). A replica certificate of block 2010 of FIG. 20 is prepared for transfer, substituting the amount to be paid as the face amount of the certificate being transferred and omitting the remaining amount field (2120). The amount, transferee and date/time information is entered into the history field and in the receipts field (2130). The entry in the receipts field is temporary pending transfer of a receipt from the payee. If no receipt is transferred, the entry becomes permanent. The replica certificate as modified is signed and transferred to the payee's token or to the payee's computer (2140). The payee sends a receipt (optionally) and such receipt is received and stored in the receipts for cash expended block of electronic cash domain of the purchaser's token.

In the way described, the electronic cash domain of the smart token can be utilized to perform what is essentially an electronic wallet function for holding electronic money.

Figure 22:
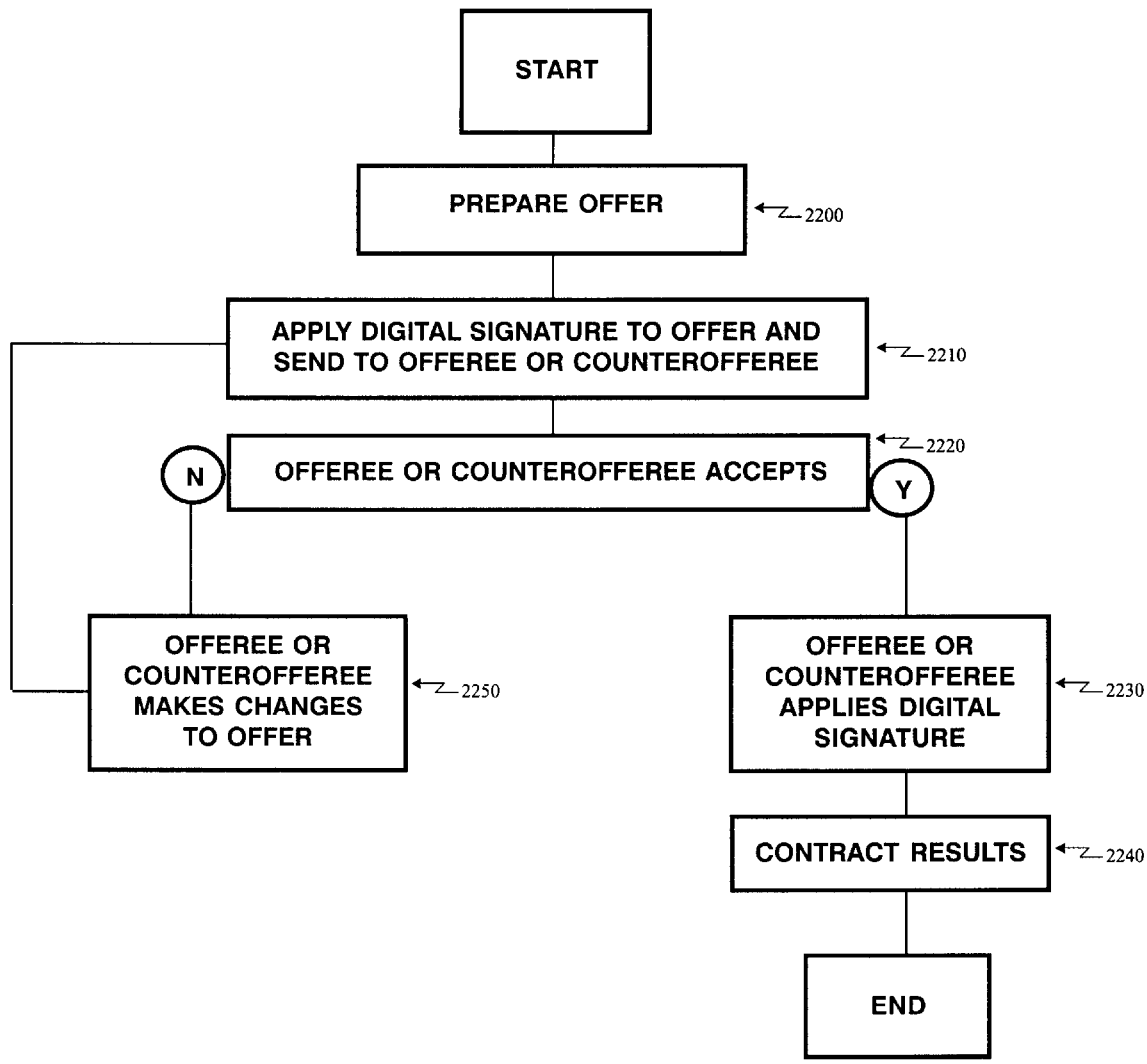
FIG. 22 is a flow chart of negotiation and entry into a contract in accordance with the invention.

FIG. 22 is a flow chart of negotiations and entry into a contract in accordance with the invention. The offeror prepares an offer (2200) and applies his digital signature to the offer and sends it to the offeree (2210). If the offeree does not accept the offer (2220-N) the offeree makes changes to the offer (2250), applies his digital signature to the revised offer, thereby becoming a counter offeror and sends it to the other party, who at this time is now a counter offeree (2210). If the counter offeree accepts (2220-Y), the counter offeree applies his digital signature (2230) and a contract results. Because of the one-way hash function utilized to create a representation of a document (discussed above) to which a digital signature is applied, the content to which a particular signature applies is always clearly defined. A digital signature by the offeror and the offeree or counter offeror and counter offeree unambiguously identifies the text to which the particular signing party has agreed. A contract results when both parties have signed the same text utilizing their secret keys. Their signatures can be validated utilizing their corresponding public keys and the certificates associated with the public key infrastructure.

Figure 23:
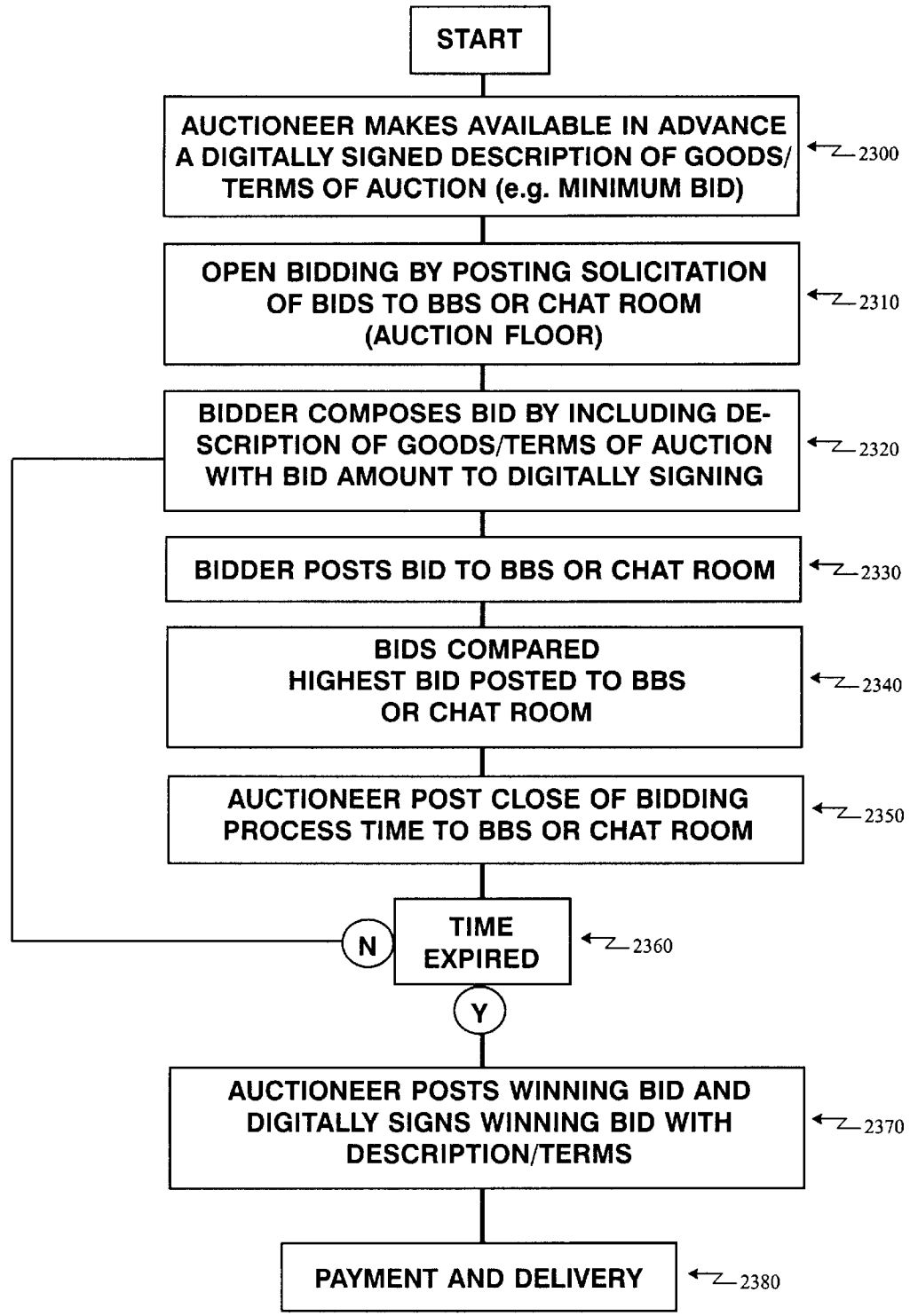
FIG. 23 is a flow chart of an auction process in accordance with the invention.

FIG. 23 is a flow chart of an auction process in accordance with the invention. When conducting an auction over a network, the auctioneer makes available in advance a description of the goods and the terms under which the auction will be held, including such items as minimum bid (2300). The auctioneer opens the bidding by posting a solicitation of bids to a bulletin board or a chat room which constitutes an electronic analog to an auction floor (2310). Each bidder interested in bidding, composes a bid by including a description of the goods/terms of auction together with a bid amount and applies a digital signature to the composite bid (2320) and optionally attaches a public key certificate authenticating his bid utilizing the capabilities of the public key infrastructure.

The bidder then posts the composed bid to the BBS or to the chat room (2330). As bids are received, the highest bid is posted to the BBS or to the chat room (2340). The auctioneer notifies participants of the time at which bidding will close by a notice to the BBS or the chat room (2350). If the time has not expired (2360-N), additional bids may be composed by looping back to block 2320. Once the time expires (2360-Y) the auctioneer posts the winning bid and digitally signs the winning bid together with description and terms (2370). Payment can be escrowed with a trusted third party in exchange for delivery (2380) if tangible property is involved. Intangible personal property can usually be transferred by applying a digital signature to an appropriate transfer document in exchange for payment. Similarly, in auctions involving property subject to a certificate of title, title can be changed by an appropriately signed and authentic electronic transfer of title, presumably via the titling agency.

Figure 24:
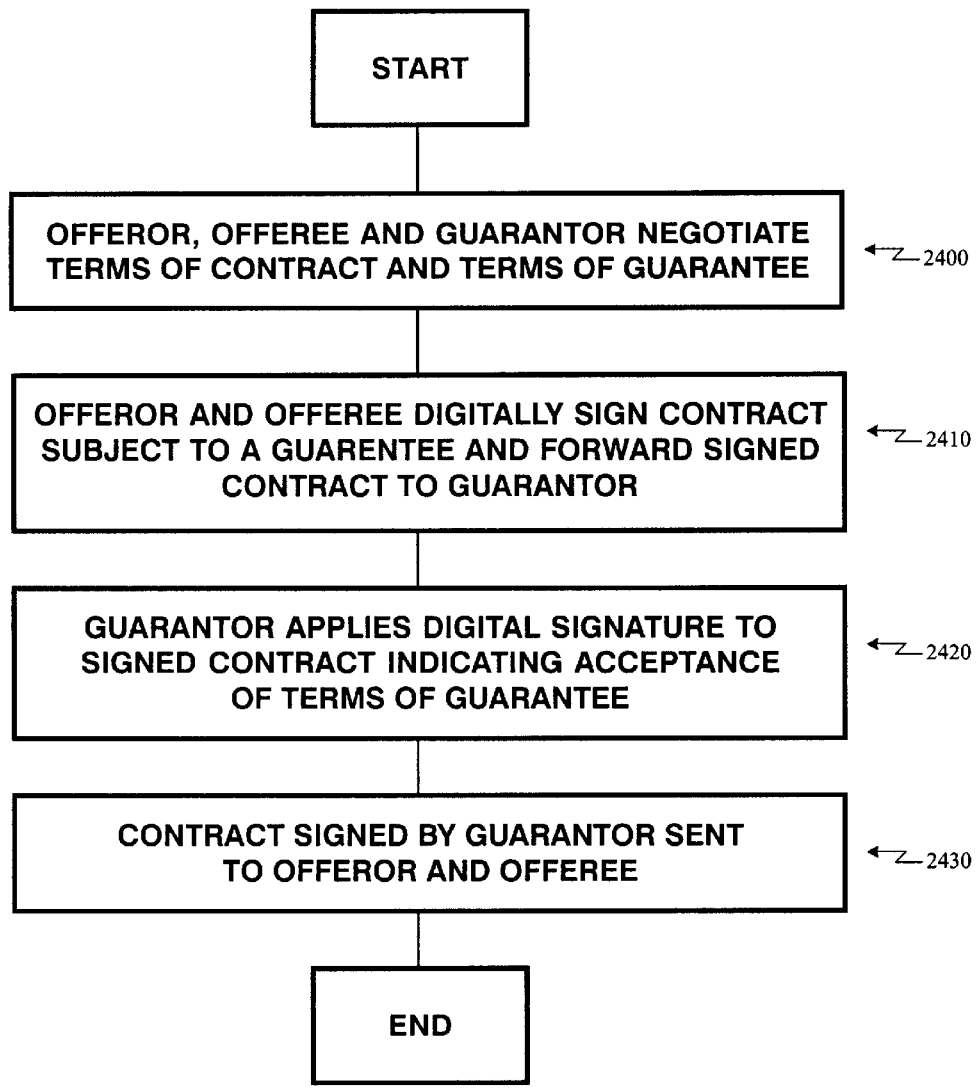
FIG. 24 is a flow chart of a process by which a guarantee can be negotiated and issued.

FIG. 24 is a flow chart of a process by which a guarantee can be negotiated and issued. An offeror, an offeree and a guarantor negotiate the terms of the substantive contract and the terms of the guarantee (2400). The offeror and the offeree digitally sign the agreed on terms of the contract subject to a guarantee and forward the signed contract to the guarantor (2410). The guarantor applies his digital signature to the signed contract indicating acceptance of the terms of the guarantee (2420) and the contract signed by the guarantor is sent to the offeror and the offeree.

Shares of stock in a corporation are generally represented by a stock certificate signed by a corporate officer or officers. Such stock certificates are issued in exchange for cash or other consideration. When a shareholder desires to sell shares of stock, this can be done either through a private sale or through someone who makes a market in the shares of stock in the corporation. There is no reason why certificates of stock cannot be electronic documents signed utilizing the secret key of the corporation as an indicator of authenticity. Similarly, there is no reason why those shares cannot be transferred as intangible personal property by a transfer agreement. To prevent fraud or deception, it is common to release the cash from a purchaser of stock to the seller of stock only when the shares have been properly transferred to the purchaser.

Figure 25:
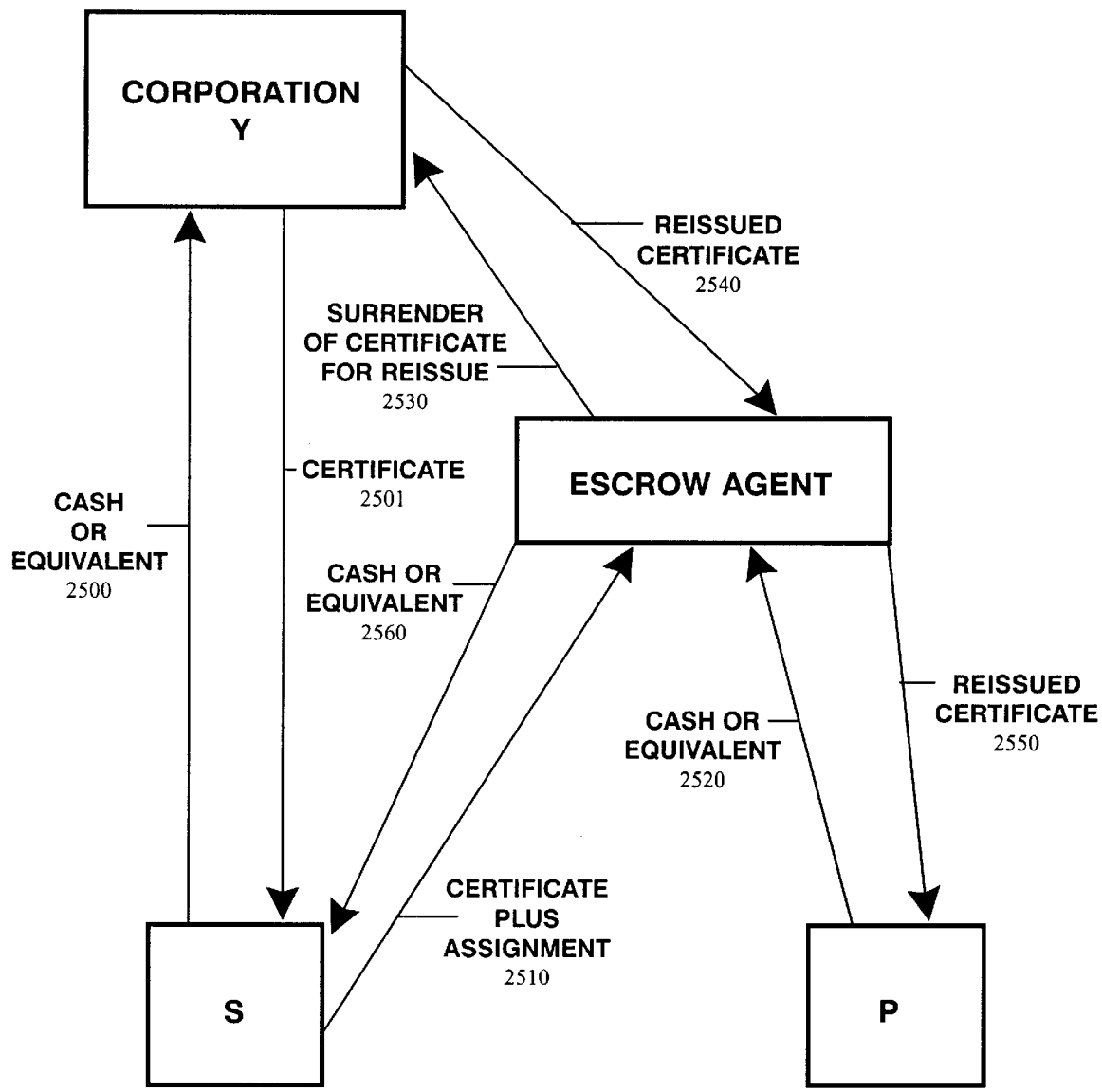
FIG. 25 illustrates a process for conducting a stock sale using an escrow agent over an electronic network.

FIG. 25 illustrates one way of performing such a transaction. Assume that shareholder S is a holder of a stock certificate in corporation Y, seller S desires to sell the shares of stock to purchaser P in exchange for cash. FIG. 25 illustrates a sale which settles utilizing an escrow agent (2530). Assuming that corporation Y has issued shares of stock to seller S in the form of an electronic certificate, seller S digitally signs a copy of the stock certificate together with an assignment of ownership and tenders it to escrow agent 2530. The escrow agent also receives a transfer of cash or credit from purchaser 2520 to be held subject to the settlement of the transaction. The escrow agent forwards the certificate and assignment to the corporation for issuance of a new certificate and when a new certificate is issued in favor of the purchaser, the new certificate can be forwarded to the purchaser and the purchaser's cash or credit transferred to the seller. As set forth above, this cash can be electronic cash, a check drawn on a bank, with or without guarantee, or cash the escrow agent receives from a credit card company drawing against a line of credit in favor of the purchaser.

A stock broker and a market maker essentially perform the function of the escrow agent in cases where the seller and the purchaser do not know of each other's mutual desire to sell and purchase the stock respectively.

Figure 26:
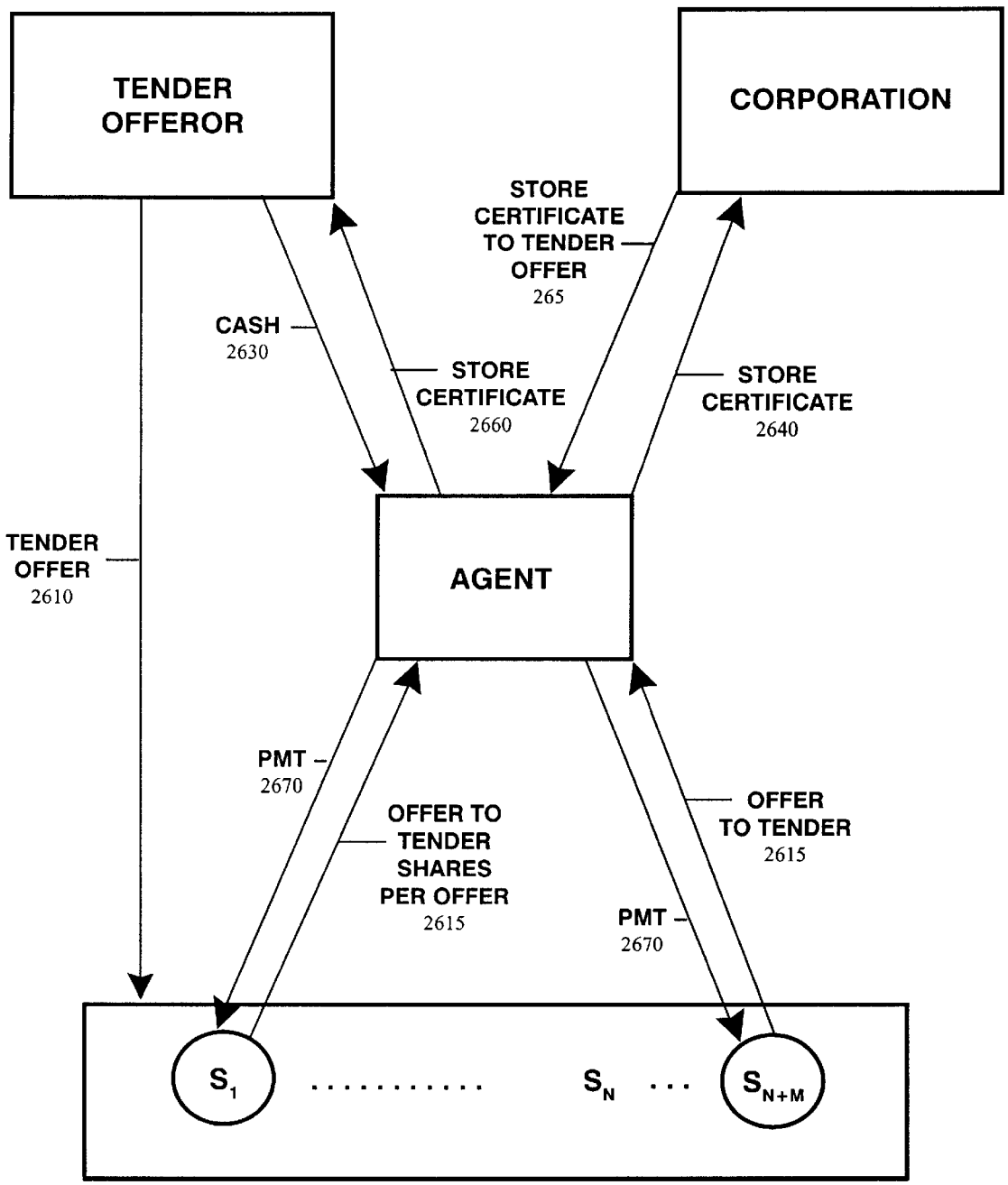
FIG. 26 illustrates a process of conducting a cash tender offer over an electronic network.

FIG. 26 illustrates a process of conducting a cash tender offer over an electronic network. The tender offeror makes a tender offer 2610 to all shareholders $S_i$, individual shareholders make a determination whether or not to tender their shares in accordance with the offer. If they do (2615), they either offer to tender their shares or actually tender their shares to the agent by either digitally signing the tender offer after completing the number of shares to be tendered or by transferring a digitally signed copy of their share certificate together with assignment language. When the required number or percentage of shares have been tendered by shareholders, the agent notifies the tender offeror that the conditions of the tender offer have been met and the tender offeror will fund the tender offer (2630) subject to the transfer of shares into tender offeror's name. The certificates tendered to the agent are transferred to the corporation (2640), each including the appropriate assignment which has been digitally signed by the shareholder. The corporation then aggregates the shares and issues a new certificate to the tender offeror (2650) and submits the share certificate to the agent. The agent then is in a position to settle the transaction by distributing the cash proceeds to the shareholders who tendered their shares and a share certificate to the tender offeror, and the transaction is completed.

Figure 27:
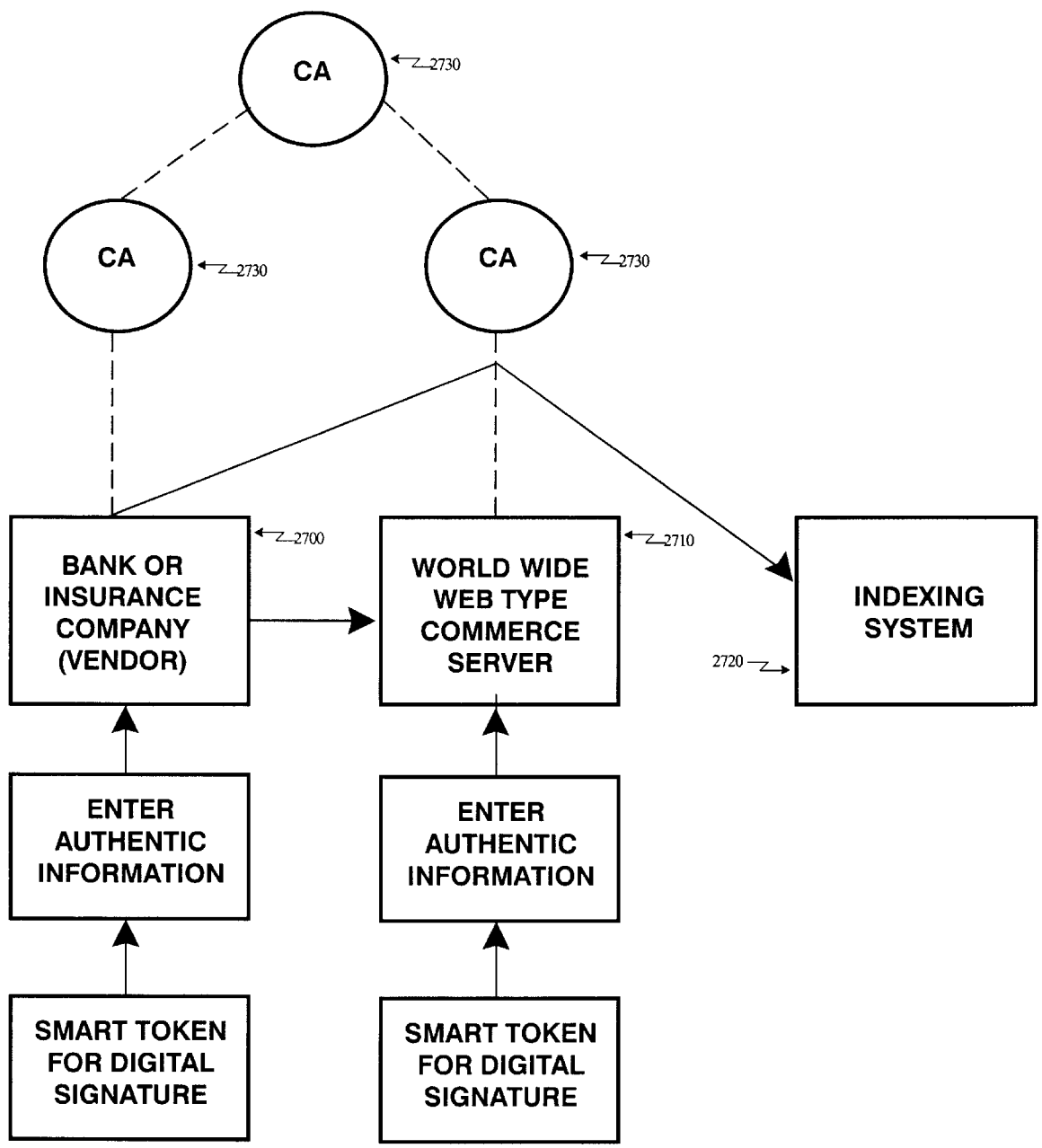
FIG. 27 illustrates a process by which the authenticity of information on a server can be guaranteed in accordance with the invention.

The operation of the invention will now be described with respect to an example involving an insurance company. In FIG. 27, insurance company 2700 maintains a home page on world wide web server 2710. The world wide web server and the insurance company public key for a public key encryption system and are duly registered and certified by certification authorities 2730. Thus, when the insurance company logs on to its world wide web server 2710, utilizing a strong authentication as set forth in conjunction with the Smart Token application, the authenticity of the log on can be determined by verifying the public key through the certification hierarchy or matrix to a common point of trust namely, the highest certification authority (CA) shown in FIG. 27. Since the public key certificates for the world wide web server and for the insurance company both contain that highest certification authority public key, the authenticity of signatures by the lower level certification authorities and ultimately the public keys of the insurance company and the world wide web server can be determined to be genuine. Thus, the server and the insurance company can be assured that the party at the other end is who they purport to be. Server 2710 can therefore permit the insurance company to log on to the edit system and make changes to the information on the server and vouch for authenticity of the information to its clients by virtue of the public key certification matrix. Thus, the information on the world wide web server can be considered authentic.

The insurance company, in addition, may wish to make itself available to a public audience by registering with either a white pages or a yellow pages server such as 2720. Alternatively, the insurance company's home page on the world wide web server can be indexed by a web crawler which discovers its presence during the course of universal indexing of the servers it finds.

Figure 28:
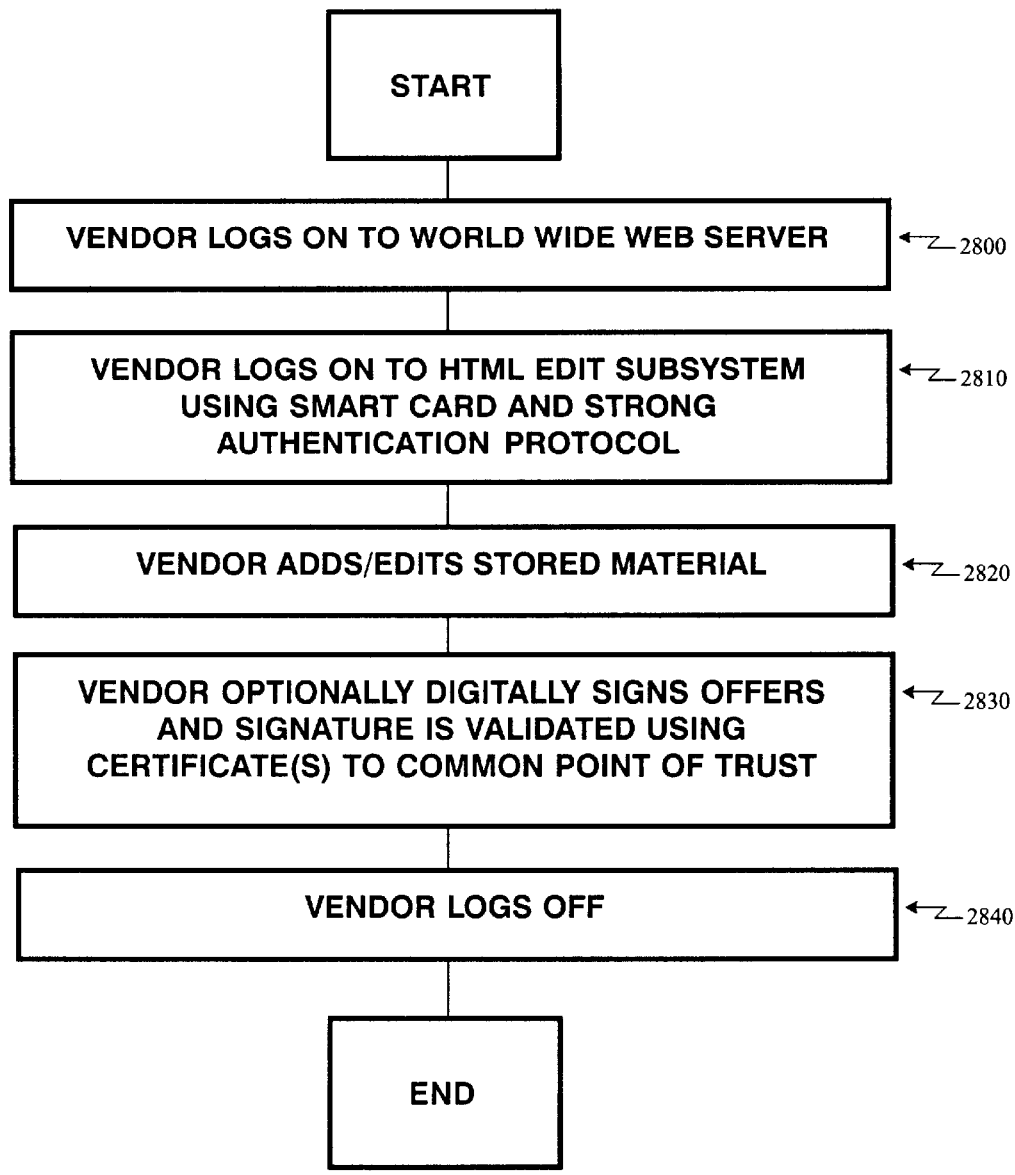
FIG. 28 is a flow chart of the process by which authentic information can be guaranteed on a server in accordance with the invention.

FIG. 28 illustrates the process just described in a somewhat different format.

Figure 29:
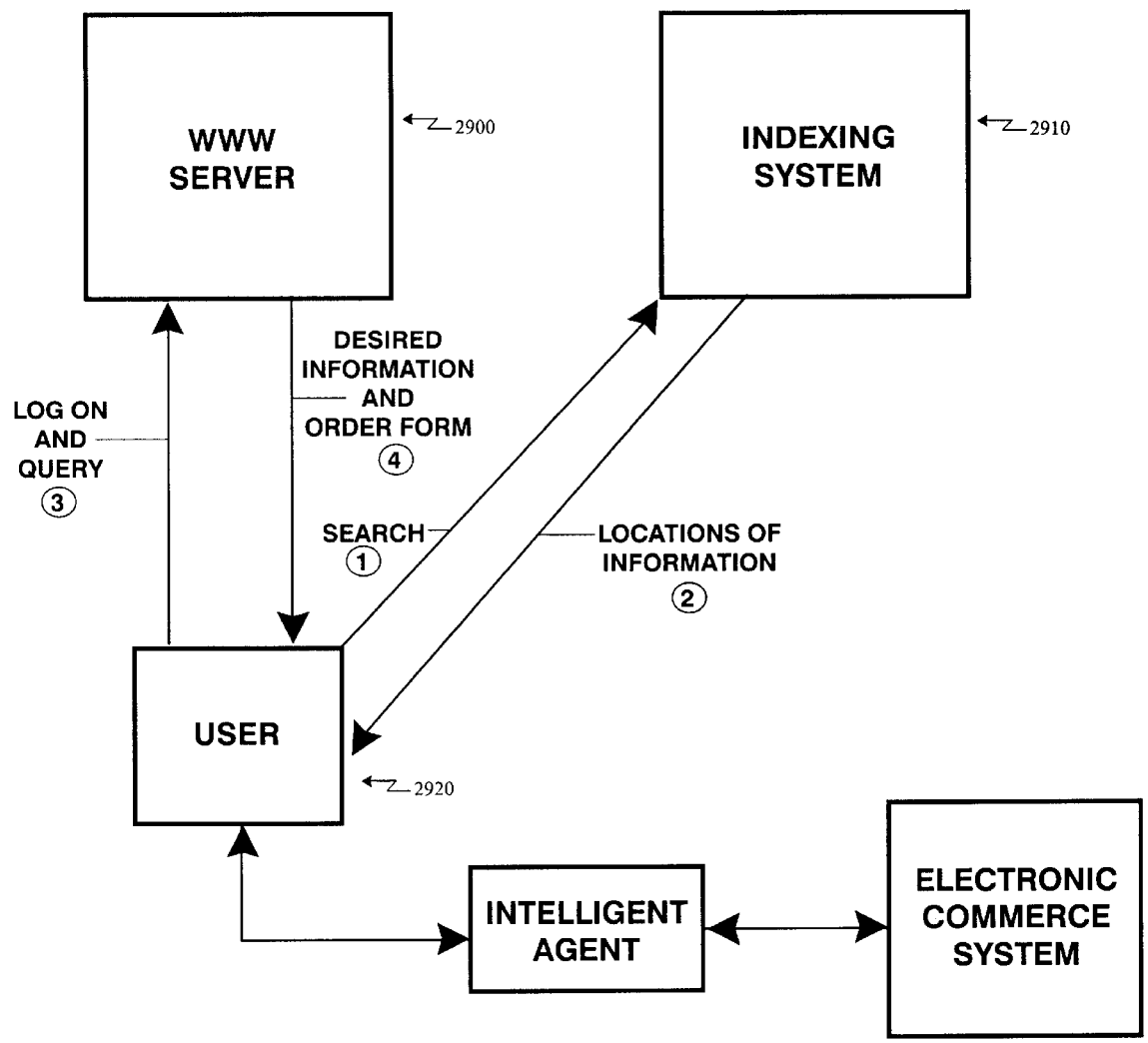
FIG. 29 illustrates a process by which searching and retrieval of information is accomplished in accordance with the invention.

FIG. 29 illustrates a process by which searching and retrieval of information over the network is accomplished in accordance with the invention. The search begins when user 2920 desires to determine information about insurance. The user logs on to an indexing system such as a white pages server, a yellow pages server, or a web crawler and submits a query including, for example, the term "insurance." The indexing system retrieves a list of servers and home pages for articles on servers in which the term "insurance" appears either in the title or in the full text of the information indexed. The locations are returned as a list of "hits" which the user considers to determine whether the server listed is an appropriate candidate for further consideration. When a good candidate is identified, the user will log on to the server identified by the indexing system, preferably through the use of a hyper text link and the user views and/or downloads desired information from the world wide web server 2900. If this information does not meet the user's needs, other hits may be considered until an appropriate hit is found.

Figure 30:
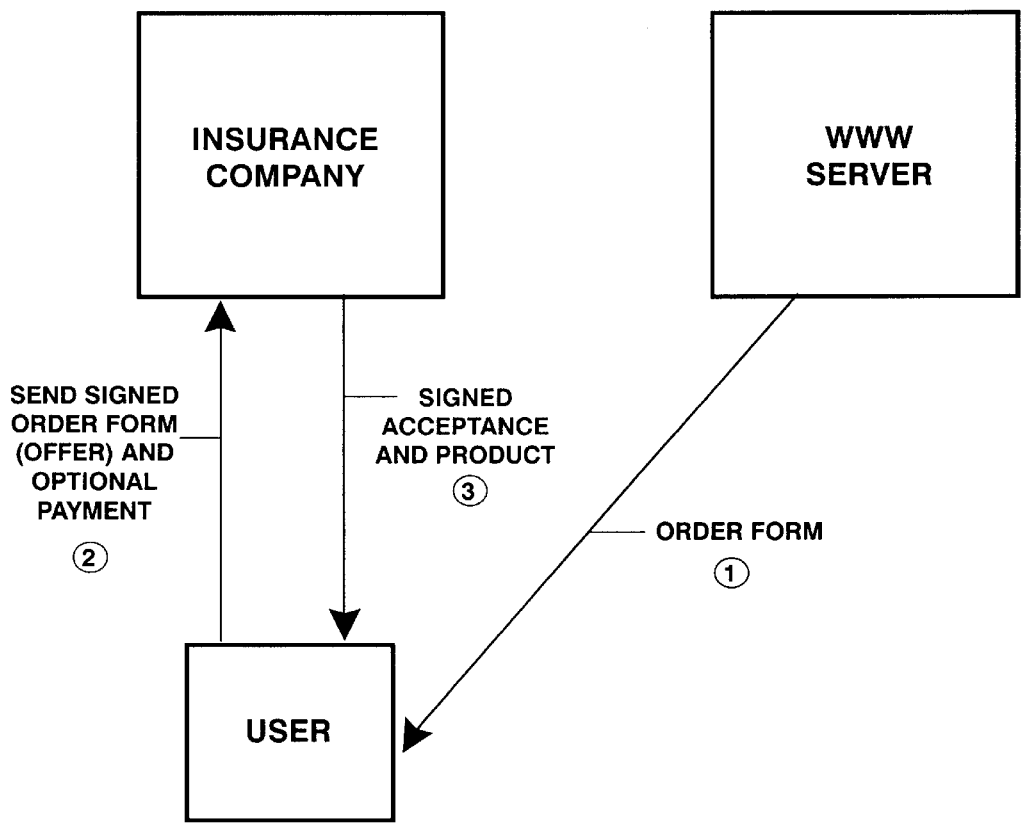
FIG. 30 illustrates a process by which an order is guaranteed in accordance with the invention.

FIG. 30 illustrates a process by which an order is placed in accordance with the invention. When the user finds a server containing information about a product the user wishes to acquire, the user may place the order in any of several ways. In one form, the user may engage in an interactive dialog with the server until a server has adequate information for the order to be processed. Then, the insurance company can retrieve that information from the server and process the order. In an alternative, but preferred form of the invention, the user retrieves an order form from the server which the user then fills out and sends the signed order form (offer) to the insurance company, optionally including payment using any one of the modes described herein. If the insurance company is willing to accept the risk, it will digitally sign the order form indicating its acceptance and, if the policy is to be issued in electronic form, transfer a digitally signed insurance policy to the user assuming appropriate payment or provision for payment has been made.

Figure 31:
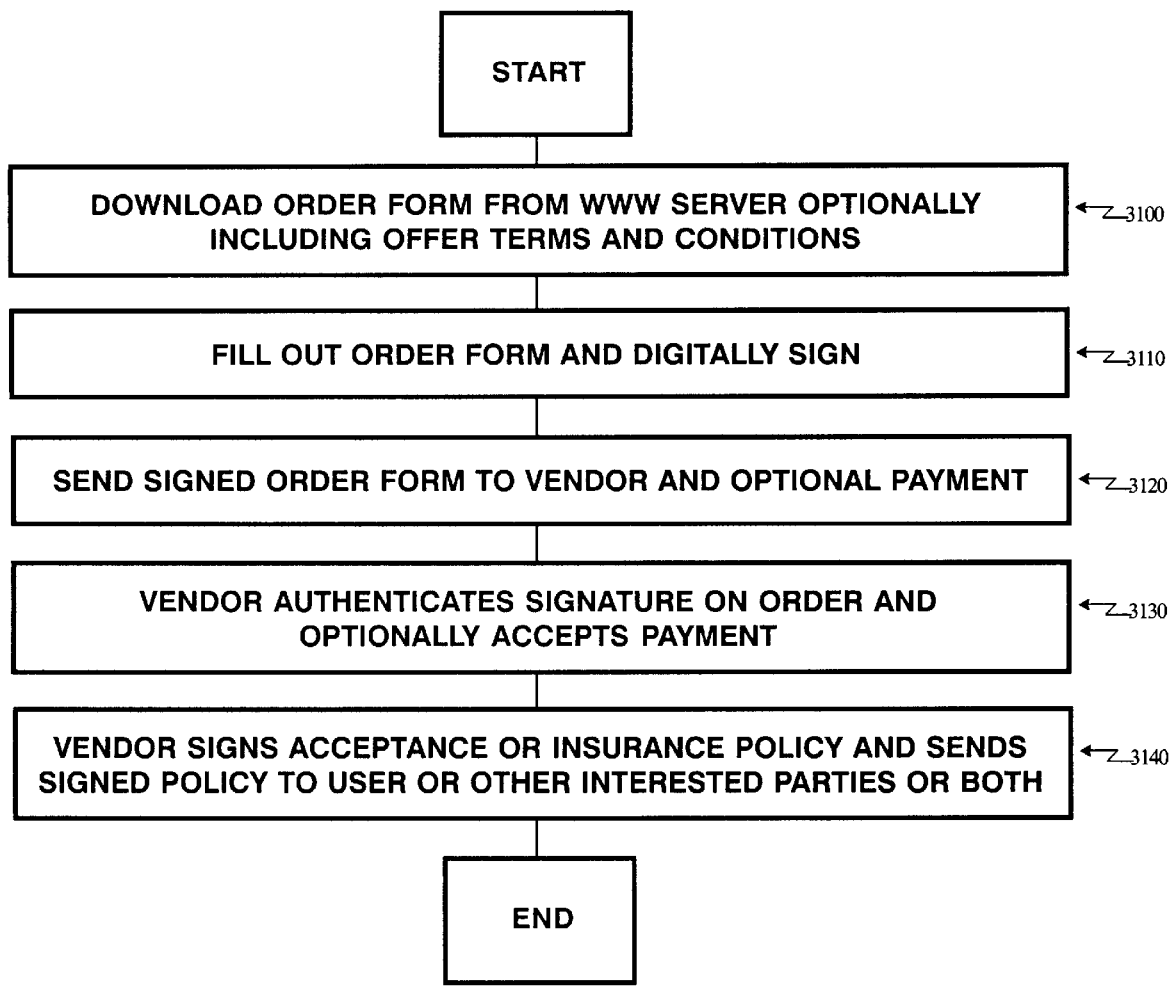
FIG. 31 is another representation of a process by which an order is placed in accordance with the invention.

FIG. 31 describes this process in somewhat more detail.

Figure 32:
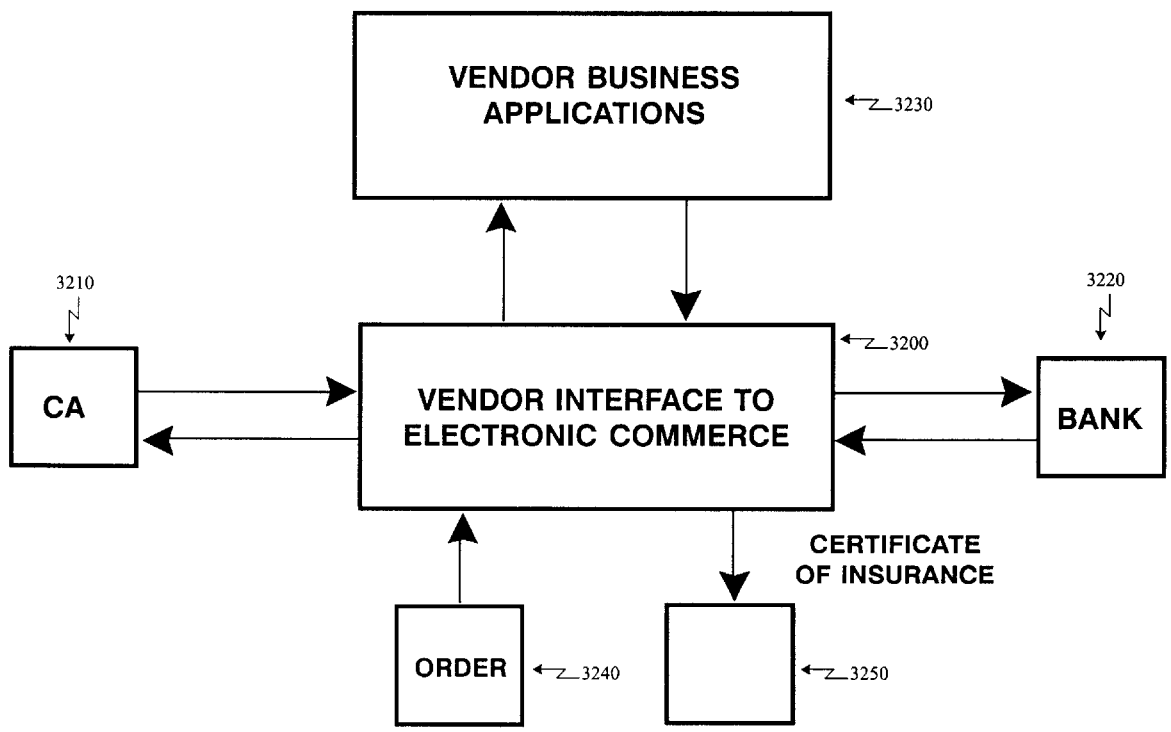
FIG. 32 illustrates relationships between a merchant's business applications software and other network components.

FIG. 32 illustrates the relationships between a merchant's business application software and other network components. A vendor's interface to electronic commerce is described in some detail above and in the incorporated copending applications. The hardware and software architecture is described above. In addition to maintaining a home page on a web server, an insurance company will likely maintain its own user access to the Internet and particularly, to the world wide web. The user is registered and certified by a certification authority 3210, thus placing him at a point in the certification hierarchy or matrix and enabling others to confirm the authenticity of his public keys. The insurance company can connect to banks to perform the various financial transactions described herein and in the incorporated applications, and the insurance company can receive orders (3240) and issue certificates of insurance (3250) over the network. All of this done in a secure and, if desired, private manner. Typically these business transactions are tracked and monitored using the insurance company's business applications (3230). These business applications might, for example, including accounting software for tracking the volume of business, applications for tracking losses and for tracking the progress of claim settlements. It might also track cash flow and stock transactions of the type described herein. It may also maintain records of agents' commissions, perform required mass mailings, keep list of policies in force, and, of course, perform billing when manual methods of billing are used.

Thus, from the insurance company example, one can see that a system has been described which enables electronic commerce to be conducted over an otherwise unsecure network in which the privacy and authenticity of the transactions can be maintained against even determined attacks by hackers using public key encryption.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A world-wide system/network for the conduct of electronic commercial and non-commercial business transactions based on a global network public key security infrastructure, comprising:

a plurality of user terminals connected to the network, at least some of said user terminals equipped with the ability to read and/or write smart tokens containing one or more encryption keys;

a plurality of application/information servers connected to the network and configured to link to the security infrastructure; and one or more security servers connected to the network, each for certifying the public keys of users registered to engage in electronic business transactions or the public keys of other security servers, wherein encryption keys fetched from said security servers are capable of being authenticated by one or more of said user terminals and used to ensure the origin and authenticity of electronic commercial transactions conducted using said user terminals and said application/information servers.

2. The network of claim 1 wherein said application/information servers are selected from the group consisting of world wide web servers, large capacity video, and document or data base servers.

3. The network of claim 1 wherein said one or more security servers link all registered users, companies and other participants into a public key infrastructure.

4. The network of claim 1 wherein user terminals run web browser software and/or E-mail software.

5. The network of claim 1 wherein information about the contents of said application/information servers is obtained using one of an indexing system, electronic white/yellow pages directory, intelligent agents or search and retrieval system.

6. A method of conducting electronic commerce over an unsecured network, comprising:

registering users in a public key infrastructure system by providing encrypting information to the users that is stored in smart tokens of the users, and certifying one or more public keys for each user, the public keys being used to decrypt information that has been encrypted by the corresponding smart token of said each user; and authenticating electronic transactions using certified public keys that are used to decrypt information that has been encrypted by the smart tokens, wherein a binding between a public key and its owner can be authenticated;

whereby authentic and authorized business transactions can occur in said unsecured network.

7. The method of claim 6 wherein the step of authenticating electronic transactions using a certified public key comprises authenticating offers, counteroffers and acceptance in a contract negotiations process.

8. The method of claim 6 wherein the step of authenticating electronic transactions using a certified public key comprises authenticating offers, bids and/or confirmations of sale in an auction process.

9. The method of claim 6 wherein the step of authenticating electronic transactions using a certified public key comprises authenticating a guarantee.

10. The method of claim 6 wherein the step of authenticating electronic transactions using a certified public key comprises authenticating orders and/or payments in a purchase/sell transaction.

11. The method of claim 6 wherein the step of authenticating electronic transactions using a certified public key comprises authenticating transfers of intangible personal property.

12. The method of claim 6 wherein the step of authenticating electronic transactions using a certified public key comprises authenticating tender offers and/or one or more tenders of shares of stock.

13. The method of claim 6 wherein the step of authenticating electronic transactions using a certified public key comprises authenticating certificates of insurance.

14. The method of claim 6 wherein the step of authenticating electronic transactions using a certified public key comprises authenticating transfers of intangibles related to an escrow transaction.

15. The method of claim 6 wherein the step of authenticating electronic transactions using a certified public key comprises authenticating transfers of electronic money.

16. The method of claim 6 wherein the step of authenticating electronic transactions using a certified public key comprises authenticating transfers of one or more software modules.

17. The method of claim 6 wherein the step of authenticating electronic transactions using a certified public key comprises authenticating transfers of one or more copyrighted documents.

18. The method of claim 6 wherein the step of authenticating electronic transactions using a certified public key comprises authenticating transfers of one or more licensed materials.

19. A method of conducting electronic commerce over an unsecured network, comprising:

authenticating, as to origin, information placed on at least one application/information server of said network;

accessing said information in an authentic and authorized way by outputting information encrypted by a smart token that has a private key used for encryption stored therein;

ordering products or services after accessing said information by sending or exchanging electronic messages that have been encrypted with said private key; and authenticating said electronic messages as to origin, recipient, or trusted third party, wherein the step of authenticating said electronic messages as to origin includes validating a public key of a public key/private key pair of a user originating at least one of said electronic messages using digital signatures of one or more certification authorities and using the public key for validation of the at least one of said electronic messages.

20. The method of claim 19 wherein the step of authenticating as to origin information placed on at application/information server unless access information received from said user decrypts and verifies properly using an authorized public key belonging to the application/information server.

21. The method of claim 19 wherein all public keys used in the protocol are validated using a public key infrastructure.

22. The method of claim 19, further comprising the step of indexing said information on an indexing server, which may be the same or different from said application/information server.

23. The method of claim 19, wherein the step of ordering a product or services after accessing said information by sending an electronic message further comprises making an electronic payment.

24. The method of claim 19 wherein all information received from remote client stations are locally processed and coupled with individual data processing applications of the services or goods provider.

25. A world wide system for secure, reliable and authorized electronic transactions and applications performed over computer and data transmission networks, comprising:
- a plurality of network servers and associated data bases including application/information servers, indexing and searching servers, addressing servers, security servers, or Trusted Third Parties servers;
- a plurality of types of multifunctional and multipurpose client stations, with user interaction tools, functions and interfaces for different types of electronic transactions; and
- a plurality of electronic business transactions protocols to access servers, to fetch information, data and services and to perform a plurality of electronic business transactions.

26. The system of claim 25, wherein the system is capable of performing official electronic registration of participants containing distinguished names, any other identification attributes, addressing and accessibility information, and professional information.

27. The system of claim 25, wherein the system is capable of being used for establishment of business and authorization profiles of participants, both companies and individuals, required in order to perform specific authorized electronic transactions.

28. The system of claim 25, wherein the system is capable of being used for controlled insertion, storage and distribution of authentic information about various products and services in a form of one or more of multimedia catalogs, brochures, sound and video advertising materials, and electronic "yellow pages", based on usage of application/documents servers and browsers.

29. The system of claim 25, wherein the system is capable of being used for electronic ordering of goods, products and services, for various financial transactions, and for various other types of business, commercial and non-commercial transactions, all enhanced with security features.

30. The system of claim 25, wherein the system is capable of being used as support for negotiation and establishment of electronic commerce documents and electronic financial transactions enhanced with digital signatures and security features.

31. A method for encoding a smart token for use in electronic commerce over an unsecured network, comprising:
- sending over the unsecured network, by a user at a user terminal to a certification server, an application for encoding the smart token;
- determining, by the certification server, whether the user is authorized to encode the smart token;
- sending, from the certification server to the user terminal, information as to whether the user has been authorized or disapproved from encoding the smart token;
- if the user has been authorized to obtain the smart token, sending information for encoding the smart token from the certification server to the user terminal over the unsecured network,
- wherein the user is capable of conducting electronic commerce transactions over the unsecured network using the encoded smart token, and
- wherein an application/information server connected on the unsecured network is capable of determining whether the user is authorized to edit any programs stored within the application/information server by comparing information encoded with a private key from the smart token of the user with information stored at the application/information server that corresponds to public keys of all authorized entities that are allowed to edit the programs stored within the application/information server.

32. The method of claim 31 wherein the smart token includes encryption keys that are utilized to ensure secure and authentic transactions between the user at the user terminal and another device connected to the unsecured network.

33. The method of claim 32, further comprising:
- verifying, by sending a request from the another device to a security server, whether a public key of the user accessing the another device is certified,
- wherein, if the public key of the user is certified, the user is authorized to conduct electronic money transactions with the another device.

34. The method of claim 32, wherein the smart token is a physical card that is encoded with software received from the certification server when the user is authorized, and
- wherein the user is capable of utilizing the smart token to provide encoded information sent over the unsecured network with the private key of the user, and
- wherein the user is capable of using the smart token as a credit card or a debit card for conducting commercial transactions at physical locations separate from the unsecured network.

35. A system for conducting electronic commerce transactions over an unsecured network, comprising:
- at least one user terminal connected to the unsecured network, the at least one user terminal configured to read and write smart tokens containing at least one encryption key stored therein;
- at least one application/information server connected to the unsecured network and configured to link to a security infrastructure within the unsecured network; and
- at least one security server connected to the unsecured network and configured to certify public key of users registered to engage in the electronic commerce transactions over the unsecured network, wherein the at least one application/information server sends a request for authentication to the at least one security server for verification of a particular public key received from the at least one user terminal when the at least one user terminal desires to conduct a particular electronic commerce transaction over the unsecured network with the at least one application/information server, wherein the at least one security server determines whether the at least one user terminal has been previously registered and certified to conduct the electronic commerce transactions and has a valid smart token, and wherein the at least one application/information server receives information from the at least one security server concerning whether the user is authorized and allows the particular electronic commerce transaction to take place if the user is authorized.

36. The system of claim 35, wherein the particular electronic commerce transaction takes place between the at least one user terminal and the at least one application/information server by the at least one user terminal encoding data with a private key from the smart token and outputting the encoded data to the at least one application/information server over the unsecured network, and by the application/information server using a public key of the user obtained from the at least one security server to decode the received data over the unsecured network to determine what type of electronic commerce transaction is desired by the user.

37. A method of conducting electronic commerce over an unsecured network, comprising:

registering a user in a public key infrastructure system by obtaining a registration request from the user over the unsecured network and determining that the user is authorized to conduct electronic commerce over the unsecured network;

sending information for encoding a smart token to the user over the unsecured network, the encoded smart token to be used by the user to conduct the electronic commerce over the unsecured network;

requesting a particular electronic commerce transaction between the user and an application/information server, the request being made over the unsecured network;

determining, by the application/information server, whether the user is authorized to conduct the particular electronic commerce transaction by requesting authorization of the user from a security server; and if the user has been determined to be authorized, then utilizing, by the application/information server, a certified public key of the user to conduct the particular electronic commerce transaction between the user and the application/information server, wherein the user utilizes a private key obtained from the smart token to conduct the particular electronic commerce transaction between the user and the application/information server.

38. A method of conducting electronic commerce over an unsecured network, comprising:

authenticating, as to origin, information received by at least one application/information server over the unsecured network, the authenticating being performed by determining whether the information received over the unsecured network is capable of being decoded using an authorized public key of the least one application/information server;

if the authenticating step determines that the origin is not an authorized origin, denying access to the at least one application/information server by a user that sent the information;

if the authenticating step determines that the origin is an authorized origin, allowing access to the at least one application/information server to conduct an electronic commerce transaction between the origin and the at least one application/information server; and authenticating electronic messages sent between the origin and the least one application/information server throughout the conducting of the electronic commerce transaction as to source, destination, or trusted third party.

* * * * *